(12) United States Patent
Wu et al.

(10) Patent No.: US 10,762,615 B2
(45) Date of Patent: Sep. 1, 2020

(54) METHOD AND SYSTEM FOR SERVICING AN OBJECT

(71) Applicant: SZ DJI TECHNOLOGY CO., LTD., Shenzhen (CN)

(72) Inventors: Yuwei Wu, Shenzhen (CN); Mingxi Wang, Shenzhen (CN); Qi Zhou, Shenzhen (CN); Di Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 133 days.

(21) Appl. No.: 16/008,706

(22) Filed: Jun. 14, 2018

(65) Prior Publication Data

US 2018/0300871 A1 Oct. 18, 2018

Related U.S. Application Data

(63) Continuation of application No. PCT/CN2015/097514, filed on Dec. 15, 2015.

(51) Int. Cl.
| | |
|---|---|
| *G06T 7/00* | (2017.01) |
| *B64C 39/02* | (2006.01) |
| *G05D 1/00* | (2006.01) |
| *B64D 47/08* | (2006.01) |
| *G05D 1/10* | (2006.01) |
| *G07C 5/00* | (2006.01) |
| *G07C 5/08* | (2006.01) |
| *H04N 7/18* | (2006.01) |

(52) U.S. Cl.
CPC .......... *G06T 7/0004* (2013.01); *B64C 39/024* (2013.01); *B64D 47/08* (2013.01); *G05D 1/0094* (2013.01); *G05D 1/104* (2013.01); *G07C 5/008* (2013.01); *G07C 5/0808* (2013.01); *H04N 7/185* (2013.01); *B64C 2201/024* (2013.01); *B64C 2201/027* (2013.01); *B64C 2201/123* (2013.01); *B64C 2201/126* (2013.01); *B64C 2201/127* (2013.01); *B64C 2201/128* (2013.01); *B64C 2201/145* (2013.01); *G06T 2207/30156* (2013.01); *G06T 2207/30248* (2013.01)

(58) Field of Classification Search
CPC .... G06T 7/0004; B64C 39/024; G05D 1/0094
USPC .......................................................... 348/128
See application file for complete search history.

(56) References Cited

U.S. PATENT DOCUMENTS

| | | | |
|---|---|---|---|
| 8,818,572 B1 * | 8/2014 | Tofte ................. | B64C 39/024 701/2 |
| 9,875,509 B1 * | 1/2018 | Harvey ............... | G06Q 40/08 |
| 2009/0122169 A1 | 5/2009 | Agan et al. | |

FOREIGN PATENT DOCUMENTS

| | | |
|---|---|---|
| CN | 103224026 A | 7/2013 |
| CN | 103730862 A | 4/2014 |
| CN | 104535649 A | 4/2015 |

(Continued)

OTHER PUBLICATIONS

The World Intellectual Property Organization (WIPO) International Search Report and Written Opinion for PCT/CN2015/097514 dated Sep. 14, 2016 6 Pages.

*Primary Examiner* — Jeffery A Williams
(74) *Attorney, Agent, or Firm* — Anova Law Group, PLLC

(57) ABSTRACT

A method for servicing an object via a mobile platform includes maintaining a distance between the mobile platform and the object and performing a task for the object while maintaining the distance.

15 Claims, 30 Drawing Sheets

(56) References Cited

FOREIGN PATENT DOCUMENTS

| CN | 104796672 A | 7/2015 |
| CN | 105045281 A | 11/2015 |

\* cited by examiner

METHOD AND SYSTEM FOR SERVICING AN OBJECT

CROSS-REFERENCE TO RELATED APPLICATION

This application is a continuation of International Application No. PCT/CN2015/097514, filed on Dec. 15, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platform technology and more particularly, but not exclusively, to methods and systems for object servicing.

BACKGROUND

Object servicing such as surface inspection is essential for routine maintenance of a wide variety of objects, such as passenger planes, ships, and buildings. For example, surface paint layer of a passenger plane can be subject to damage due to environmental factors such as salt fog, sand dust, lightning strike and bombardment of foreign objects. The damage can result in defects such as chipping or cracking of the surface paint layer. The defect can be located at any location on the fuselage of the passenger plane.

Conventionally, inspection of the defects mainly relies on close-distance visual inspection by a human with the aid of a lift. The visual inspection by the human often needs to traverse the entire fuselage of the passenger plane. Therefore, the inspection often consumes a significant amount of human labor and time.

In view of the foregoing, there is a need for methods and systems for inspecting an object that overcome the disadvantages of currently-available methods and systems.

SUMMARY OF THE DISCLOSURE

The present disclosure relates to a system for servicing an object and methods for making and using same.

In accordance with a first aspect disclosed herein, there is set forth a method for servicing an object via a mobile platform, including:

maintaining a distance between the mobile platform and the object; and performing a task for the object during the maintaining.

In some embodiments of the disclosed method, the maintaining includes maintaining the distance between the mobile platform and a surface of the object.

In some embodiments of the disclosed method, the maintaining further includes maintaining the distance within a predetermined range of distances.

In some embodiments of the disclosed method, the maintaining further includes maintaining the distance based on operation conditions of the mobile platform.

In some embodiments of the disclosed method, the method further includes monitoring the distance in one or more directions relative to the mobile platform.

In some embodiments of the disclosed method, the method further includes monitoring the distance via at least one of ultrasound sensing and visual sensing.

In some embodiments of the disclosed method, the monitoring the distance includes:

measuring the distance via the ultrasound sensing to obtain a first measurement;

measuring the distance via the visual sensing to obtain a second measurement; and determining the distance based on at least one of the first measurement and the second measurement.

In some embodiments of the disclosed method, the determining includes determining the distance based on the first measurement when the second measurement detects no texture of interest on the object.

In some embodiments of the disclosed method, the determining includes determining the distance based on the second measurement when the first measurement receives an ultrasound echo having an intensity below a predetermined intensity limit.

In some embodiments of the disclosed method, the method further includes moving toward a selected service point of the object.

In some embodiments of the disclosed method, the method further includes arriving at the selected service point of the object.

In some embodiments of the disclosed method, the method further includes obtaining a position of the selected service point based on:

a spatial relationship between the selected service point and the object; and a position and an orientation of the object.

In some embodiments of the disclosed method, the obtaining includes obtaining the position of the selected service point based on the position of the object, the position of the object being determined via one or more control points each having a predetermined spatial relationship with the object.

In some embodiments of the disclosed method, the obtaining includes obtaining the position of the selected service point based on the orientation of the object, the orientation of the object being determined via one or more control points each having a predetermined spatial relationship with the object.

In some embodiments of the disclosed method, the method further includes moving along a travel path to move toward the selected service point.

In some embodiments of the disclosed method, the method further includes flying along the travel path.

In some embodiments of the disclosed method, the method further includes determining a position of the mobile platform via a position tracking device onboard the mobile platform.

In some embodiments of the disclosed method, the method further includes determining the position of the mobile platform based on at least one of a Global Positioning System (GPS) signal and a differential Global Positioning System (DGPS) signal.

In some embodiments of the disclosed method, the performing includes performing one or more different tasks.

In some embodiments of the disclosed method, the performing includes performing each of the different tasks using a respective payload on the mobile platform.

In some embodiments of the disclosed method, the performing includes:

capturing an image of the object by using a camera of the mobile platform; and transmitting the image to a computer associated with the mobile platform for analysis of the object.

In some embodiments of the disclosed method, the method further includes capturing a zoom-in image of a selected feature of the object based on the analysis of the object.

In some embodiments of the disclosed method, the performing includes performing the task in cooperation with one or more other mobile platforms.

In some embodiments of the disclosed method, the performing includes capturing an image of the object that complements one or more images captured by the other mobile platforms.

In some embodiments of the disclosed method, the performing includes performing the task in coordination with the other mobile platforms including an unmanned aerial vehicle (UAV), a ground vehicle, or a combination thereof.

In accordance with another aspect disclosed herein, there is set forth a system for servicing an object, including:

a trip controller for operating onboard a mobile platform and directing the mobile platform to:

maintain a distance between the mobile platform and the object; and perform a task for the object at the maintained distance.

In some embodiments of the disclosed system, the trip controller directs the mobile platform to maintain the distance between the mobile platform and a surface of the object.

In some embodiments of the disclosed system, the trip controller directs the mobile platform to maintain the distance within a predetermined range of distances.

In some embodiments of the disclosed system, the trip controller directs the mobile platform to maintain the distance being based on operation conditions of the mobile platform.

In some embodiments of the disclosed system, the trip controller monitors the distance in one or more directions relative to the mobile platform via one or more sensors onboard the mobile platform.

In some embodiments of the disclosed system, the trip controller monitors the distance via at least one of an ultrasound sensor and a visual sensor onboard the mobile platform.

In some embodiments of the disclosed system, the trip controller operates to:

measure the distance via the ultrasound sensor to obtain a first measurement, measure the distance via the visual sensor to obtain a second measurement, and determine the distance based on at least one of the first measurement and the second measurement.

In some embodiments of the disclosed system, the trip controller operates to determine the distance based on the first measurement when the second measurement detects no texture of interest on the object.

The system of claim 32 or claim 33, wherein the trip controller operates to determine the distance based on the second measurement when the first measurement receives an ultrasound echo having an intensity below a predetermined intensity limit.

In some embodiments of the disclosed system, the trip controller directs the mobile platform to move toward a selected service point of the object.

In some embodiments of the disclosed system, the trip controller directs the mobile platform to arrive at the selected service point of the object.

In some embodiments of the disclosed system, a position of the selected service point is based on:

a spatial relationship between the selected position and the object; and a position and an orientation of the object.

In some embodiments of the disclosed system, the position of the object is based on one or more control points each having a predetermined spatial relationship with the object.

In some embodiments of the disclosed system, the orientation of the object is based on one or more control points each having a predetermined spatial relationship with the object.

In some embodiments of the disclosed system, the trip controller directs the mobile platform to move along a travel path to approach the selected service point.

In some embodiments of the disclosed system, the trip controller directs the mobile platform to fly along the travel path.

In some embodiments of the disclosed system, the trip controller operates to obtain a position of the mobile platform via a position tracking device onboard the mobile platform.

In some embodiments of the disclosed system, the trip controller operates to obtain the position of the mobile platform based on at least one of a Global Positioning System (GPS) signal and a differential Global Positioning System (DGPS) signal.

In some embodiments of the disclosed system, the trip controller directs the mobile platform to perform one or more different tasks.

In some embodiments of the disclosed system, the mobile platform is adapted to carry a respective payload for performing each of the different tasks.

In some embodiments of the disclosed system, the mobile platform includes a camera for capturing an image of the object, and the mobile platform operates to transmit the captured image to a computer associated with the mobile platform for analysis of the object.

In some embodiments of the disclosed system, the camera operates to capture a zoom-in image of a selected feature of the object based on the analysis of the object.

In some embodiments of the disclosed system, the mobile platform operates to perform the task in cooperation with one or more other mobile platforms.

In some embodiments of the disclosed system, the mobile platform operates to capture an image of the object that complements one or more images captured by the other mobile platforms.

In some embodiments of the disclosed system, the other mobile platforms include an unmanned aerial vehicle (UAV), a ground vehicle, or a combination thereof.

In accordance with another aspect disclosed herein, there is set forth an unmanned aerial vehicle (UAV) for servicing an object, including:

a trip controller that directs the UAV to:

maintain a distance between the UAV and the object; and perform a task for the object at the maintained distance; and one or more propellers for moving the UAV based on instructions from the trip controller.

In accordance with another aspect disclosed herein, there is set forth a non-transitory computer-readable storage medium storing one or more programs, the one or more programs including instructions, which when executed by a trip controller, instruct the trip controller to service an object.

In accordance with another aspect disclosed herein, there is set forth a method for operating a mobile platform, including:

determining one or more service points based on a model of an object; and directing the mobile platform to perform one or more tasks at the determined service points.

In some embodiments of the disclosed method, the method further includes directing the mobile platform to maintain a distance from the object.

In some embodiments of the disclosed method, the determining includes determining a selected service point of the service points in a relative coordinate system based on the model.

In some embodiments of the disclosed method, the directing includes directing the mobile platform to travel based on an absolute coordinate system.

In some embodiments of the disclosed method, the method further includes determining a position of a selected service point of the service points.

In some embodiments of the disclosed method, the method further includes determining coordinates of the selected service point in an absolute coordinate system, wherein the coordinates in the absolute coordinate system are determined based on:

coordinates of the selected service point in a relative coordinate system according to the model; and a transformation relationship between the absolute coordinate system and the relative coordinate system.

In some embodiments of the disclosed method, the method further includes determining the transformation relationship according to a position and an orientation of the object.

In some embodiments of the disclosed method, the method further includes obtaining the model of the object.

In some embodiments of the disclosed method, the obtaining includes obtaining a three-dimensional model of the object.

In some embodiments of the disclosed method, the method further includes selecting a region of interest of the object based on the model.

In some embodiments of the disclosed method, the method further includes determining a distribution of the service points over the region of interest.

In some embodiments of the disclosed method, the method further includes determining the position of the object based on one or more control points each having each having predetermined relative coordinates.

In some embodiments of the disclosed method, the method further includes determining the orientation of the object based on one or more control points each having predetermined relative coordinates.

In some embodiments of the disclosed method, the method further includes:

determining the position of the object based on a first control point of the control points; and determining the orientation of the object based on the first control point and a second control point of the control points.

In some embodiments of the disclosed method, the method further includes selecting the control points having a spacing therebetween that is greater than a predetermined spacing limit.

In some embodiments of the disclosed method, the method further includes obtaining coordinates of a selected control point of the control points in an absolute coordinate system by using a position tracking device onboard the mobile platform, wherein the mobile platform is located at the selected control point.

In some embodiments of the disclosed method, the method further includes directing the mobile platform to traverse the service points along a travel path.

In some embodiments of the disclosed method, the method further includes determining a position of the mobile platform via a position tracking device onboard the mobile platform.

In some embodiments of the disclosed method, the method further includes determining a position of the mobile platform based on based on at least one of a Global Positioning System (GPS) signal and a differential Global Positioning System (DGPS) signal.

In some embodiments of the disclosed method, the method further includes directing the mobile platform to capture an image of the object at a selected service point of the service points.

In some embodiments of the disclosed method, the method further includes directing the mobile platform to capture images of the object in one or more perspectives.

In some embodiments of the disclosed method, the method further includes presenting the captured image.

In some embodiments of the disclosed method, the method further includes selecting a feature of the object via feature recognition based on the captured image.

In some embodiments of the disclosed method, the method further includes directing the mobile platform to capture a zoom-in image for the selected feature.

In some embodiments of the disclosed method, the method further includes transmitting the captured image to a computer system of a third party for analysis.

In accordance with another aspect disclosed herein, there is set forth a system for operating a mobile platform, including:

a task manager that operates to:

determine one or more service points based on a model of an object; and direct the mobile platform to perform one or more tasks at the determined service points.

In some embodiments of the disclosed system, the task manager directs the mobile platform to maintain a distance between the mobile platform and the object.

In some embodiments of the disclosed system, the task manager determines a selected service point of the service points in a relative coordinate system based on the model.

In some embodiments of the disclosed system, the task manager directs the mobile platform to travel based on an absolute coordinate system.

In some embodiments of the disclosed system, the task manager operates to determine a position of a selected service point of the service points.

In some embodiments of the disclosed system, the coordinates in the absolute coordinate system are determined based on:

coordinates of the selected service point in a relative coordinate system according to the model; and a transformation relationship between the absolute coordinate system and the relative coordinate system.

In some embodiments of the disclosed system, the task manager determines the transformation relationship according to a position and an orientation of the object.

In some embodiments of the disclosed system, the task manager operates to obtain the model of the object.

In some embodiments of the disclosed system, the task manager operates to obtain a three-dimensional model of the object.

In some embodiments of the disclosed system, the task manager operates to select a region of interest of the object based on the model.

In some embodiments of the disclosed system, the task manager operates to determine a distribution of the service points over the region of interest.

In some embodiments of the disclosed system, the task manager operates to determine the position of the object based on one or more control points each having predetermined relative coordinates.

In some embodiments of the disclosed system, the task manager operates to determine the orientation of the object based on one or more control points each having predetermined relative coordinates.

In some embodiments of the disclosed system, the task manager operates to:

determine the position of the object based on a first control point of the control points; and determine the orientation of the object based on the first control point and a second control point of the control points.

In some embodiments of the disclosed system, the task manager operates to select the control points having a spacing therebetween that is greater than a predetermined spacing limit.

In some embodiments of the disclosed system, the task manager operates obtain coordinates of a selected control point of the control points in an absolute coordinate system by using a position tracking device onboard the mobile platform, wherein the mobile platform is located at the selected control point.

In some embodiments of the disclosed system, the task manager operates to direct the mobile platform to traverse the service points along a travel path.

In some embodiments of the disclosed system, the task manager operates to determine a position of the mobile platform via a position tracking device onboard the mobile platform.

In some embodiments of the disclosed system, the task manager operates to determine a position of the mobile platform based on at least one of a Global Positioning System (GPS) signal and a differential Global Positioning System (DGPS) signal.

In some embodiments of the disclosed system, the task manager operates to direct the mobile platform to capture an image of the object at a selected service point of the service points.

In some embodiments of the disclosed system, the task manager operates to direct the mobile platform to capture images of the object in one or more perspectives.

In some embodiments of the disclosed system, the task manager operates to present the captured image.

In some embodiments of the disclosed system, the task manager operates to select a feature of the object via feature recognition based on the captured image.

In some embodiments of the disclosed system, the task manager operates to direct the mobile platform to capture a zoom-in image for the selected feature.

In some embodiments of the disclosed system, the task manager operates to transmit the captured image to a computer system of a third party for analysis.

In accordance with another aspect disclosed herein, there is set forth a non-transitory computer-readable storage medium storing one or more programs, the one or more programs including instructions, which when executed by a task manager, instruct the task manager to operate a mobile platform.

In accordance with another aspect disclosed herein, there is set forth a system for servicing an object, including:

a mobile platform; and a task manager for:

determining one or more service points based on a model of an object; and directing the mobile platform to perform one or more tasks at the determined service points.

BRIEF DESCRIPTION OF THE DRAWINGS

FIG. 26 is an exemplary diagram illustrating an embodiment of a system for servicing the object of FIG. 1, wherein the system includes a terminal device associated with the mobile platform.

Figure 1:
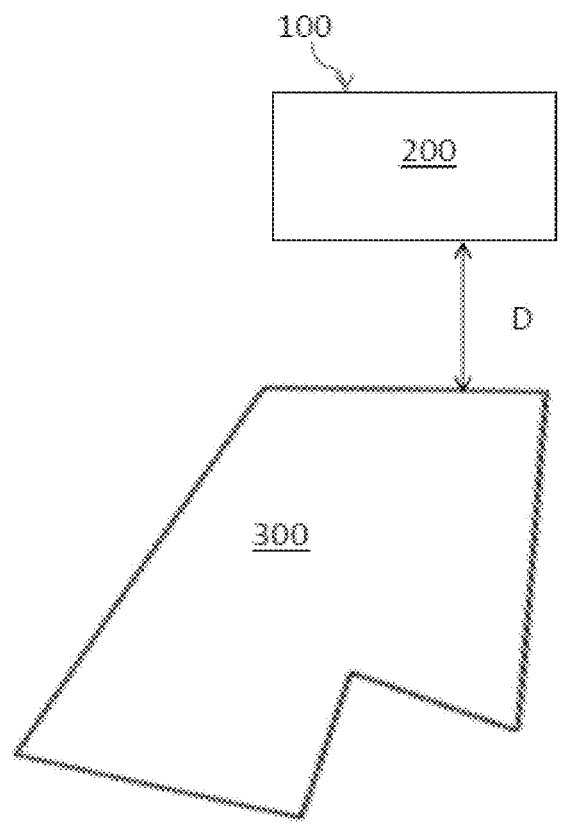
FIG. 1 is an exemplary diagram illustrating an embodiment of a mobile platform shown in relation to an object.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available methods and systems are incapable of efficiently and automatically inspecting an object, a method and system that improves efficiency in inspecting the object and automating inspection process can prove desirable and provide a basis for a wide range of applications. The applications can include inspection for planes, ships, and buildings. Not necessarily limited to inspection, the method and system can be useful for any industrial work that involves implementing a function at a selected location of an object. This result can be achieved, according to embodiments disclosed herein, by a system 100 as illustrated in FIG. 1.

The system 100 can be used for servicing an object 300. The object 300 can include any structure with a shape. Exemplary structures can include planes, ships, space shuttles, buildings, bridges, mountains, caves, tunnels, transportation pipelines, water body, and/or the like. The shape can be fixed and/or can change over time. The object 300 can change shape on its own and/or can change shape due to external forces, including with and/or without human involvement. The object 300 can be stationary and/or moving. For example, the object 300 can make movements that are rotational and/or translational.

The system 100 can service the object 300, for example, by performing a task (and/or taking an action) associated with (and/or involving) the object 300, including any task for benefiting the object 300. Exemplary actions can include inspecting, repairing, supplying maintenance for, and/or obtaining data of the object 300.

FIG. 1 shows the system 100 as including a mobile platform 200. Examples of the mobile platform 200 can include, but are not limited to, bicycles, automobiles, trucks, ships, boats, trains, helicopters, aircraft, various hybrids thereof, and the like. In some embodiments, the mobile platform 200 can include an unmanned aerial vehicle (UAV). Colloquially referred to as "drones," UAVs are aircraft without a human pilot (or operator) onboard the vehicle whose flight can be controlled autonomously and/or by a remote pilot (or sometimes both). UAVs are now finding increased usage in civilian applications involving various aerial operations, such as data-gathering or delivery. The present systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

As shown in FIG. 1, the mobile platform 200 can operate to maintain a distance D from the object 300. The distance D can refer to a spacing between the mobile platform 200 and the object 300. The distance D, for example, can include a predetermined distance and/or a range of predetermined distances. Advantages of maintaining the distance D can include, for example, preventing the mobile platform 200 from colliding with the object 300.

Although FIG. 1 shows one distance D, the mobile platform 200 can be positioned at one or more uniform and/or different distances D from the object 300.

Figure 2:
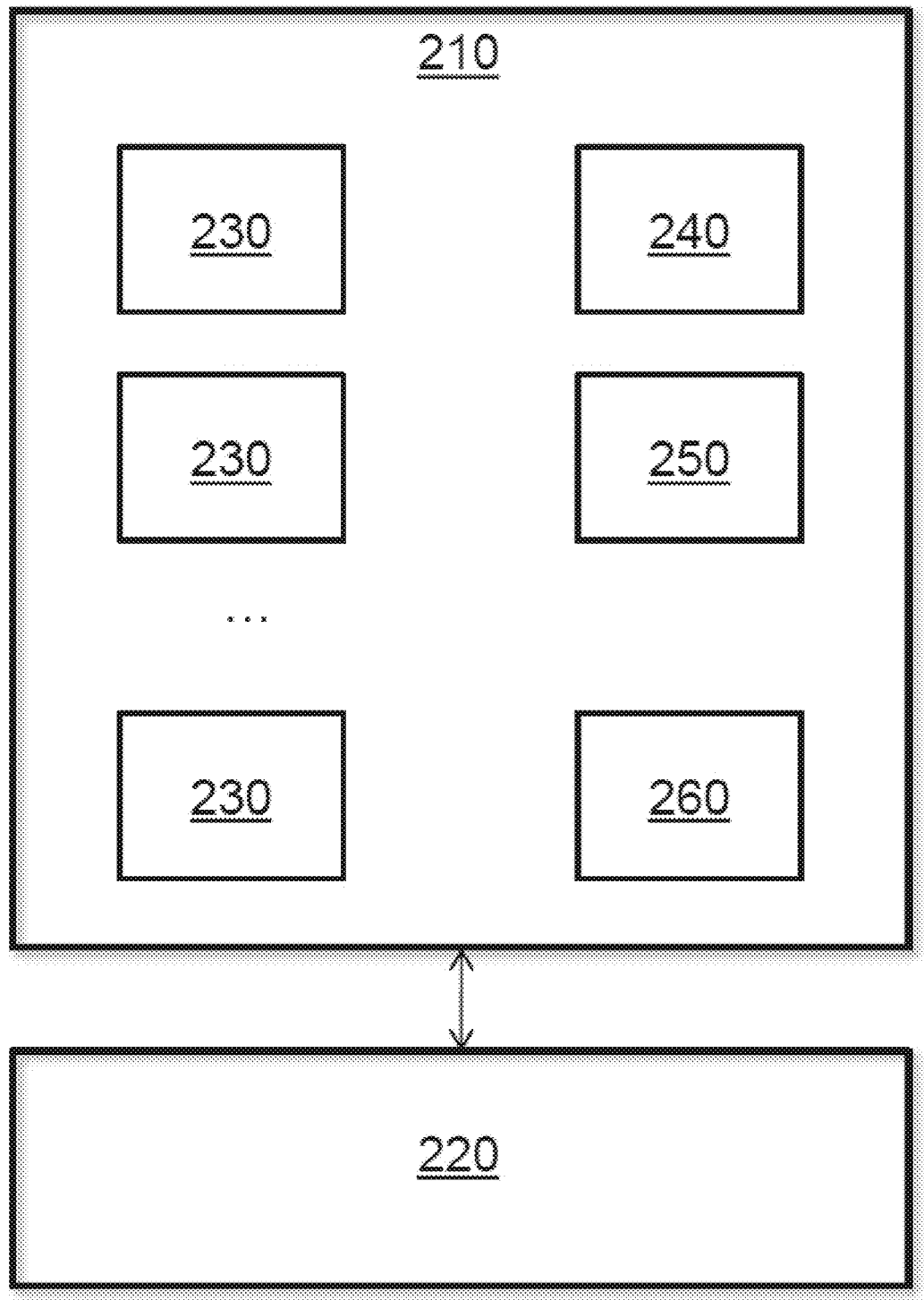
FIG. 2 is an exemplary diagram illustrating an embodiment of a mobile platform control system mounted aboard the mobile platform of FIG. 1.

Turning now to FIG. 2, the mobile platform 200 is shown as including a mobile platform control system 210. The mobile platform control system 210 can include one or more sensors 230. The mobile platform control system 210 can include any number of sensors 230, as desired—for example, 1, 2, 3, 4, 5, 6, or even a greater number of sensors 230. The sensors 230 can be arranged in any desired manner on the mobile platform control system 210, with the specific arrangement of sensors 230 depending on the application. The sensors 230 can advantageously be lightweight and capable of high-frequency data collection so as to facilitate real-time object distance detection and collision avoidance. Exemplary sensors 230 suitable for use in the mobile platform control system 210 include, but are not limited to, color or monochrome visual sensors, electro-optical sensors, thermal/infrared sensors, time-of-flight sensors, ultrasound sensors, multi-spectral imaging sensors, spectrophotometers, spectrometers, thermometers, illuminometers, microphones/sonic transducers, and others.

The sensors 230 can interface with one or more processors 240. The processors 240 can function as a trip controller for directing some or all operations of the mobile platform 200. When the mobile platform 200 includes a UAV, the processors 240 can function as a flight controller. Without limitation, each processor 240 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processors 240 can be configured to perform any of the methods described herein, including but not limited to, a variety of operations relating to object distance detection and collision avoidance. In some embodiments, the processors 240 can include specialized hardware for processing specific operations relating to object distance detection and collision avoidance—for example, processing ultrasound data, processing visual sensor data, determining the distance D (shown in FIG. 1) based on collected data, and controlling the mobile platform 200 based on the determined distance D.

In some embodiments, the processor 240 can be located in physical proximity to the sensors 230. In such cases, the processor 240 and the sensors 230 can be configured to communicate locally, for example, using hardware connectors and buses. An advantage of local communication is that transmission delay can be reduced to facilitate real-time object distance detection and collision avoidance.

In other embodiments, the processors 240 can be at least partially located remotely from the sensors 230. Measurement data obtained by the sensors 230 can be transmitted to the remote processors 240 for processing. The remote processors 240 can generate a control signal based on the measurement data and send the control signal back to the mobile platform 200. Various wireless communication methods can be used for remote communication between the sensors 230 and the processors 240. Suitable communication methods include, for example, radio, Wireless Fidelity (Wi-Fi), cellular, satellite, and broadcasting.

As shown in FIG. 2, the mobile platform control system 100 can include one or more additional hardware components (not shown), as desired. Exemplary additional hardware components include, but are not limited to, a memory 250 (for example, a random access memory (RAM), static RAM, dynamic RAM, read-only memory (ROM), programmable ROM, erasable programmable ROM, electrically erasable programmable ROM, flash memory, secure digital (SD) card, etc.), and/or one or more input/output interfaces (for example, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces). One or more input/output devices 260 (for example, buttons, a keyboard, keypad, trackball, displays, and a monitor) can also be included in the mobile platform control system 210, as desired.

FIG. 2 shows the mobile platform 200 as including a movement mechanism 220. The movement mechanism 220 can include one or more of rotors, propellers, blades, engines, motors, wheels, axles, magnets, nozzles, animals, or human beings. For example, the mobile platform 200 may have one or more propulsion mechanisms. In certain embodiments, the mobile platform 200 can include a UAV, and the UAV can include one or more propellers for generating a thrust and thereby propelling the UAV.

In some embodiments, when being controlled by the mobile platform control system 210 and/or the processors 240, the movement mechanism 220 can permit the mobile platform 200 to make selected movements. Exemplary movements can include taking off from a surface or ground, landing on ground, travelling at a selected velocity, travelling to a selected destination, hovering in air at a selected position and/or orientation, or a combination thereof.

For example, the movement mechanism 220 can include one or more motors each driving one or more propellers. The propellers can thus provide lift and/or thrust to the mobile platform 200. Rotation rate of each of the propellers can be varied independently and/or collectively in order to control the lift and/or thrust produced by each propeller, and thereby adjust spatial disposition, velocity, and/or acceleration of the mobile platform 200. For example, spatial disposition, velocity, and/or acceleration of the mobile platform 200 can be adjusted with respect to up to three degrees of translation and up to three degrees of rotation.

Figure 3:
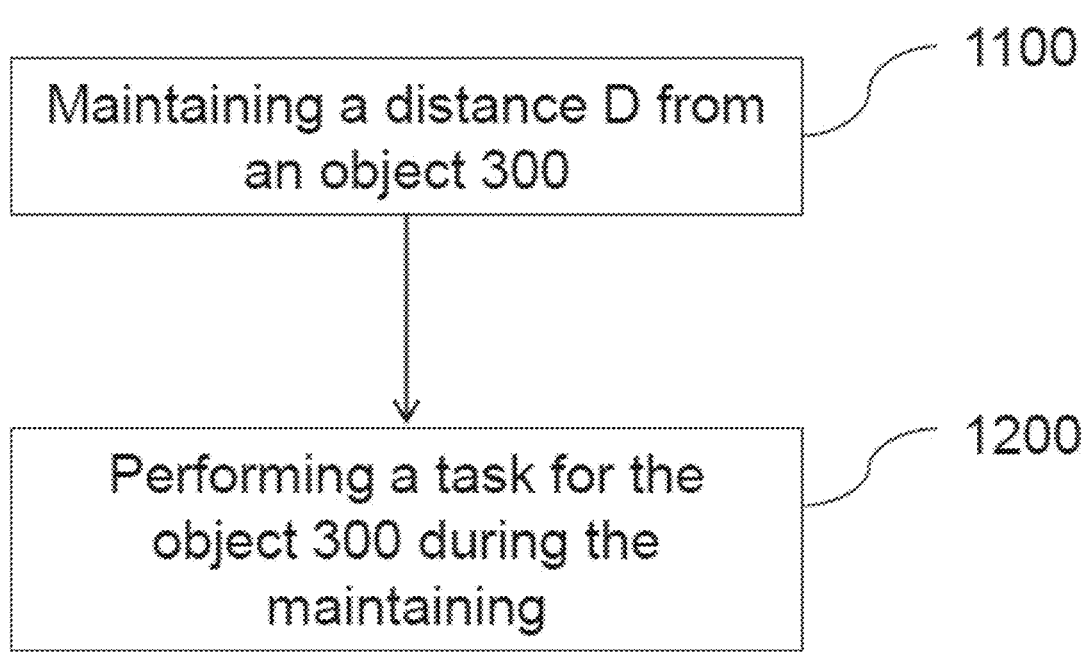
FIG. 3 is an exemplary top-level flow chart illustrating an embodiment of a method for servicing the object via the mobile platform of FIG. 1.

FIG. 3 is an exemplary top-level flow chart illustrating an embodiment of a method 1000 for servicing the object via the mobile platform 200. At 1100, the distance D from the object 300 is maintained. The mobile platform 200 can maintain the distance D from the object 300. The mobile platform 200 can maintain the distance D from any selected part of the object 300. For example, the mobile platform 200 can maintain the distance D from a surface of the object 300. The surface can refer to a selected surface region and/or the entire surface of the object 300.

To maintain the distance D, the mobile platform control system 210 can monitor the distance D via one or more of the sensors 230. When the mobile platform control system 210 (shown in FIG. 2) detects that the distance D has deviated from the predetermined distance, the mobile platform control system 210 can control the movement mechanism 220 (shown in FIG. 2) to make the mobile platform 200 adjust velocity and/or position, and thereby keep the distance D at the predetermined distance and/or within the range of predetermined distances.

As shown in FIG. 3, a task is performed, at 1200, for the object 300 during the maintaining. The mobile platform 200 can perform one or more tasks for the object 300 during maintaining of the distance D. The task can include any functions that the mobile platform 200 can implement for the object at the distance D. In certain non-limiting examples, the task can include capturing still and/or video images, making measurements and/or applying substance such as coatings.

In order to maintain the distance D, at 1100, the mobile platform control system 210 can determine the distance D based on measurements by the sensors 230, and compare the distance D with the predetermined distance. The predetermined distance can be determined based on one or more factors, selected from a wide variety of factors. For example, the predetermined distance can be determined and/or dynamically adjusted based on the task that the mobile platform 200 performs, at 1200, and/or based on one or more operation conditions of the mobile platform 200.

Exemplary operating conditions can include environmental conditions surrounding the mobile platform 200. An exemplary environmental condition can include a wind condition. Wind surrounding the mobile platform 200 can make the mobile platform 200 shift position. When the distance D is too short, the mobile platform 200 can easily collide with the object 300 under force of the wind because the mobile platform 200 may not have sufficient time and/or distance to adjust movement to compensate for unintended position shifting.

Additionally and/or alternatively, exemplary operating conditions can include accuracy of control system and/or movement of the mobile platform 200. For example, the sensors 230 can have certain measurement errors and/or tolerances. The mobile platform control system 210 and/or the movement mechanism 220 can also have certain errors. Additionally and/or alternatively, any position tracking device for measuring position of the mobile platform 200 can have certain measurement errors. Thus, actual value of the distance D can deviate from the predetermined value that the distance D needs to be maintained at. When the distance D is too short, the mobile platform 200 may collide with the object 300. Thus, for safe operation, the mobile platform 200 can maintain the distance D to be greater than a predetermined lower distance limit. For example, when the mobile platform 200 is a UAV, an exemplary lower distance limit can be at least 60 cm.

Additionally and/or alternatively, the mobile platform 200 can maintain the distance D in order to perform a certain task optimally. For example, the mobile platform 200 can maintain the distance D to be greater than a lower limit and/or less than an upper limit in order to capture an image of a selected region of the object at a selected size of field of view and/or resolution.

Thus, to avoid collision and/or to perform the task with success, the mobile platform 200 can maintain the distance D to be within a predetermined range of distances. In certain embodiments, the predetermined range of distances can be based on factors such as the operation conditions of the mobile platform 200. Stated somewhat differently, the distance D being maintained between the mobile platform 200 and the object 300 can be based on the operation conditions of the mobile platform 200.

The mobile platform 200 can monitor the distance D, in order to adjust movements for maintaining the distance D. The distance D can include one or more distances D1, D2, . . . , Dn. The distances can be measured in uniform and/or different directions relative to the mobile platform 200. The distances can be measured between the mobile platform 200 and uniform and/or different locations on the object 300. The distances that the mobile platform 200 maintains at different locations on the object 300 can be uniform and/or different. In one example, the mobile platform 200 can be at least partially surrounded by the object 300. Thus, the mobile platform 200 can monitor the distance D in one or more directions relative to the mobile platform 200. Advantageously, the mobile platform 200 can avoid collision in one or more directions.

Figure 4:
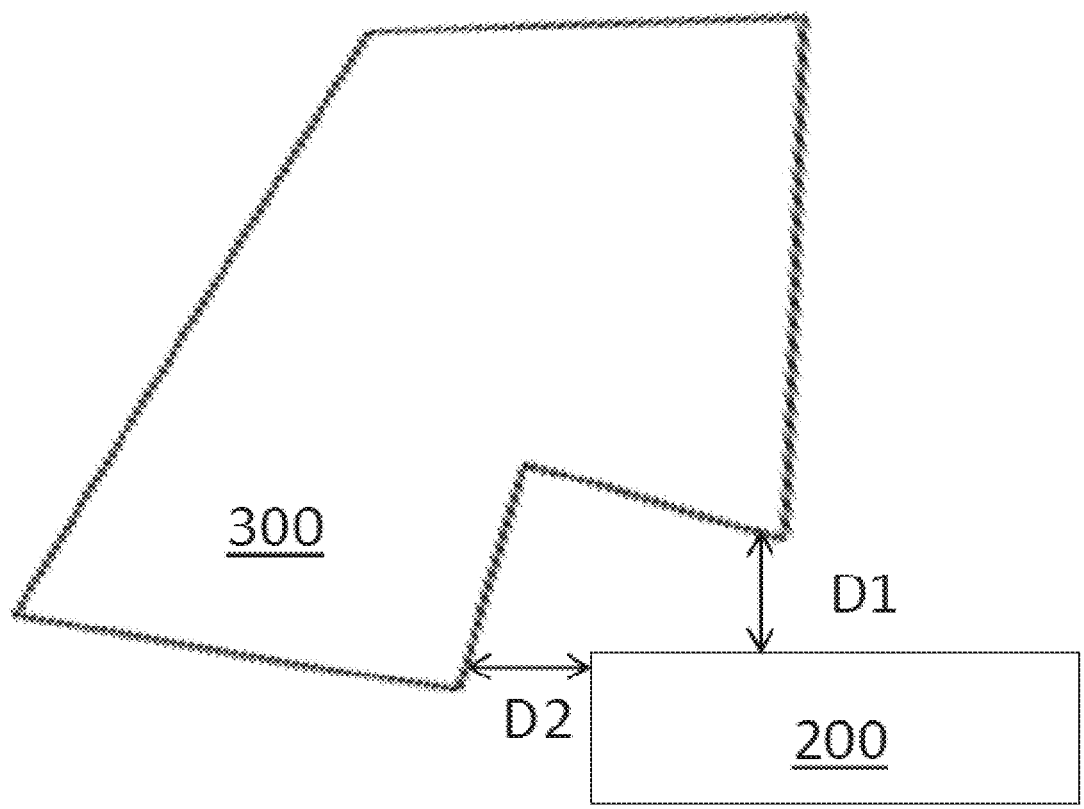
FIG. 4 is an exemplary diagram illustrating an alternative embodiment of the mobile platform of FIG. 1, wherein the mobile platform monitors a distance from the object in one or more directions.

Turning to FIG. 4, the object 300 can be at a first distance D1 from the mobile platform 200 in a first direction relative to the mobile platform 200 and at a second distance D2 in a second direction relative to the mobile platform 200. The first direction can be the same as, and/or different from, the second direction. The mobile platform 200 can monitor the first and second distances D1, D2 in any suitable manner, including sequentially and/or simultaneously.

Although two directions are shown in FIG. 4, the mobile platform 200 can monitor any number of distances D1, D2 in any number of directions, without limitation. Although FIG. 4 illustrates the distances D1, D2 between the mobile platform 200 and the object 300, the distances D1, D2 can be between the mobile platform 200 and two or more objects. For example, an obstacle (not shown) can be adjacent to the object 300. While monitoring distances D1, D2 from the object 300, the mobile platform 200 can monitor a distance between the mobile platform 200 and the obstacle in order to avoid colliding with the obstacle.

Figure 5:
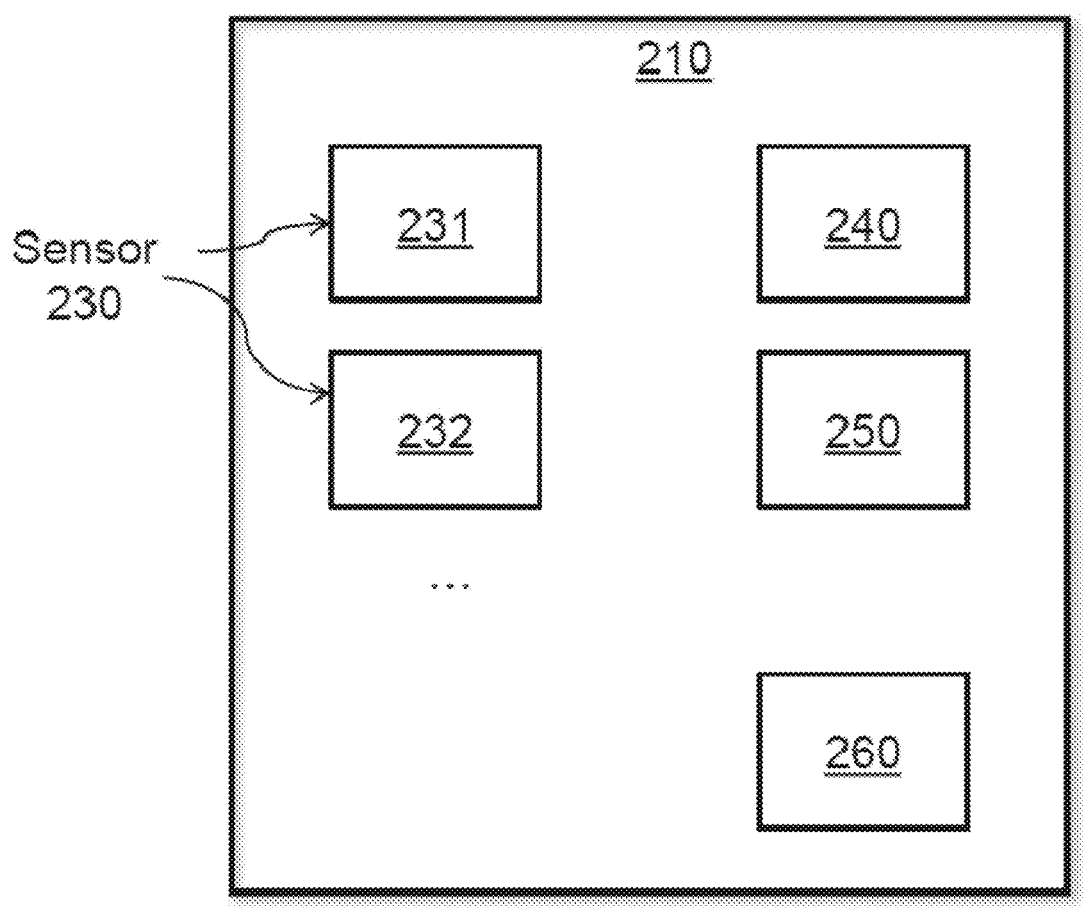
FIG. 5 is an exemplary diagram illustrating an alternative embodiment of the mobile platform of FIG. 4, wherein the mobile platform includes at least one of an ultrasound sensor and a visual sensor.

The mobile platform 200 can monitor the distance D in any manners. Turning to FIG. 5, for example, the sensors 230 can include an ultrasound sensor 111 and/or a visual sensor 112 for measuring the distance D. The mobile platform 200 can monitor the distance D via the ultrasound sensor 111 and/or the visual sensor 112.

Although FIG. 5 shows the sensors 230 as including the ultrasound sensor 231 and/or the visual sensor 232, the mobile platform 200 can include any additional and/or alternative sensors 230 for measuring the distance D (shown in FIG. 1). For example, the mobile platform 200 can include a time-of-flight sensor. Although FIG. 5 shows the sensors 230 as including one ultrasound sensor 231, the sensors 230 can include a plurality of uniform and/or different ultrasound sensors 231. Although FIG. 5 shows the sensors 230 as including one visual sensor 232, the sensors 230 can include a plurality of uniform and/or different visual sensors 232.

Although shown as distinct devices for illustrative purposes only, two or more of the sensors 230 of the mobile platform control system 210 can be integrated partially or fully into a single device, and/or share one or more overlapping physical components such as a housing, microchips, photosensors, detectors, communications ports, and the like. For example, in some embodiments, the ultrasound sensor 231 can share the processor 240 with the visual sensor 232. In other embodiments, the sensors 230 can be physically discrete devices for ease of replacement and modularity.

The visual sensor 232 can ascertain the distance D via visual sensing. Visual sensing can refer to sensing by analyzing one or more images of an object of interest. Exemplary visual sensing method can include stereopsis (and/or stereoscopy). The visual sensor 232 can include two or more imaging devices, each capturing an image of a point of interest on the object 300. A difference between locations of the point of interest in the images can be used for providing the distance D.

Figure 6:
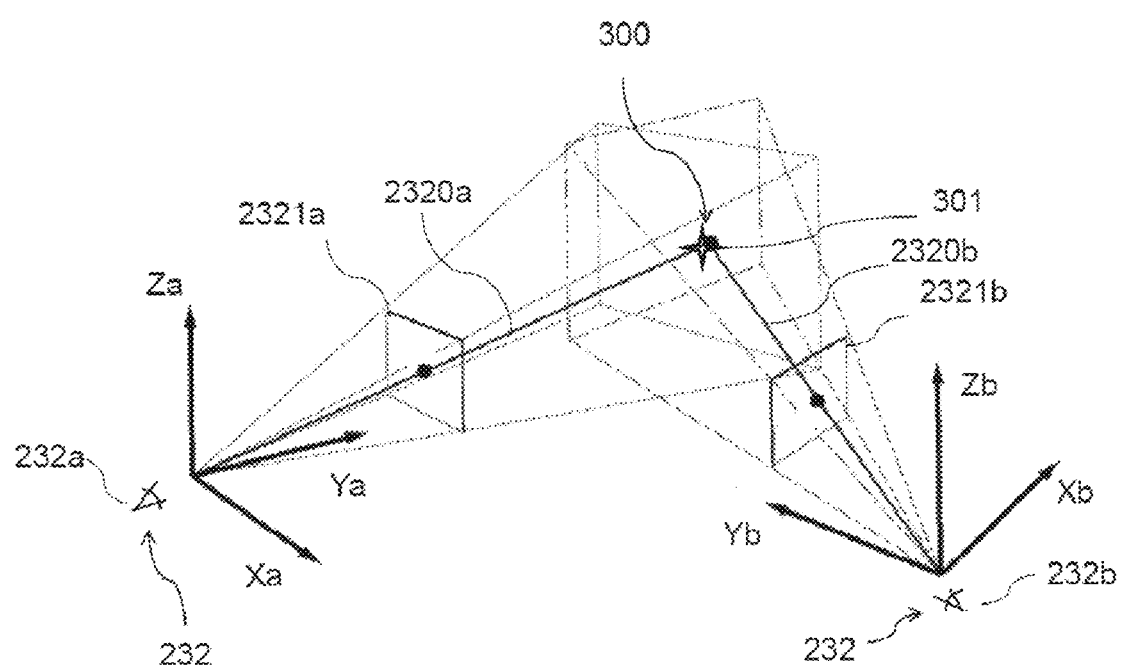
FIG. 6 is an exemplary diagram illustrating measurement of the distance of FIG. 4 using stereopsis.

Referring now to FIG. 6, the visual sensor 232 is shown as including a first imaging device 232a and a second imaging device 232b. FIG. 6 illustrates a method of ascertaining the distance D using stereopsis with reference to the two imaging devices 232a, 232b. Each of the imaging devices 232a and 232b perceives a same feature point 301 of interest on the object 300, but in different spatial coordinates as illustrated by the coordinate axes (Xa, Ya, Za) and (Xb, Yb, Zb). The imaging devices 232a and 232b perceive the feature point 301 of interest along their respective optical axes 2320a and 2320b and thereby arrive at two different two-dimensional images 2321a and 2321b of the feature point 301 of interest. The two-dimensional images 2321a and 2321b are typically different, being taken from different positions, unless the imaging devices 232a and 232b are positioned such that their optical axes 2320a and 2320b coincide. Accordingly, under most circumstances, a binocular disparity d (shown in Equation (4)) can be found between the images 2321a and 2321b, as described below with reference to FIG. 7.

Figure 7:
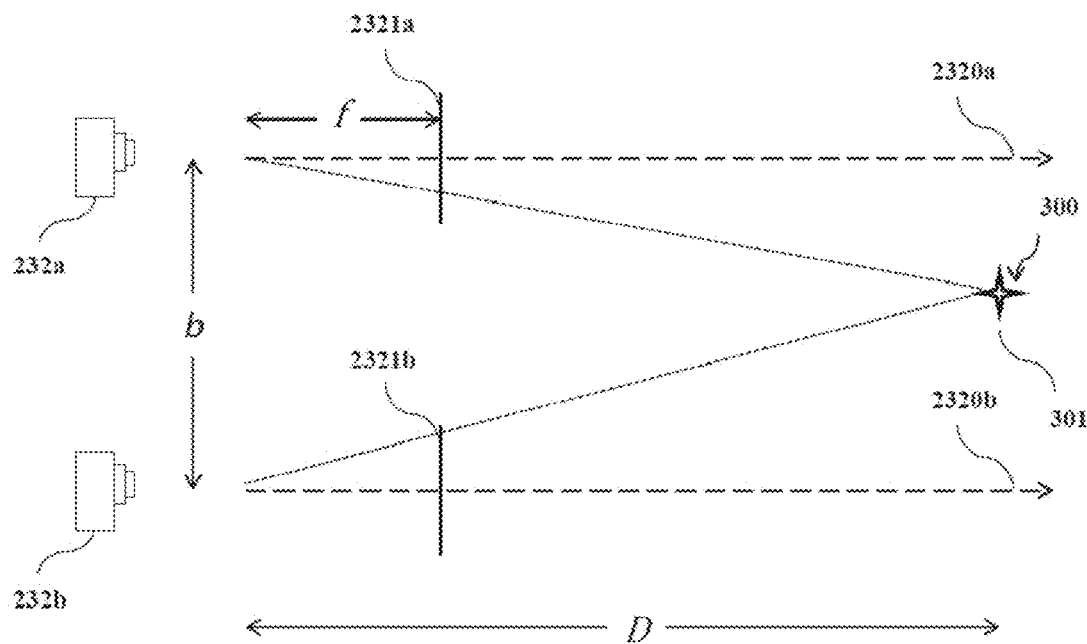
FIG. 7 is an exemplary diagram illustrating measurement of the distance of FIG. 4 using triangulation.

Referring now to FIG. 7, two-dimensional images 2321a and 2321b can be compared to ascertain the distance D between the pair of imaging devices 232a and 232b (or equivalently, the visual sensor 232) and the feature point 301 of interest. A method of triangulation can be used to ascertain the distance D using the binocular disparity d (shown in Equation (4)). Specifically, the position of a feature point 301 of interest having an index i, represented by its coordinates $(x_i, y_i, z_i)$, can be given as follows:

$$x_i = \frac{b}{d}(x_i^a - c_x),\quad\quad\text{Equation (1)}$$

$$y_i = \frac{b}{d}(y_i^a - c_y),\text{ and}\quad\quad\text{Equation (2)}$$

$$z_i = \frac{b}{d}f\quad\quad\text{Equation (3)}$$

where $c_x$ and $c_y$ represent respective center coordinates of the imaging devices 232a and 232b, $x_i$ and $y_i$ represent the coordinates of the object 150 of interest in one or both of the images 2321a and 2321b, b is the baseline (in other words, the distance between the center coordinates of the imaging devices 232a and 232b), f is the focal length of each imaging devices 232a and 232b (assuming here that the imaging devices have the same focal length), i is an index over multiple feature points 301 of interest of the object 300, and d is the binocular disparity between the images 2321a and 2321b, represented here as:

$$d_i = x_i^a - x_i^b\quad\quad\text{Equation (4)}$$

Based on the images 2321a and 2321b and using Equations (3-4), the visual sensor 232 can determine the coordinate $z_i$. The distance D can be equal to, and/or based on, magnitude of the coordinate Measurement by the visual sensor 232 can include identifying and/or selecting feature points 301 of the object 300 in the images 2321a and 2321b. The feature points 301 can be identified based on machine vision and/or artificial intelligence methods, and the like. Suitable methods include feature detection, extraction and/or matching techniques such as RANSAC (RANdom SAmple Consensus), Shi & Tomasi corner detection, SURF blob (Speeded Up Robust Features) detection, MSER blob (Maximally Stable Extremal Regions) detection, SURF (Speeded Up Robust Features) descriptors, SIFT (Scale-Invariant Feature Transform) descriptors, FREAK (Fast REtinA Keypoint) descriptors, BRISK (Binary Robust Invariant Scalable Keypoints) descriptors, HOG (Histogram of Oriented Gradients) descriptors, and the like.

When the distance D is less than and/or equal to 5 meters, the error of distance measurement by an exemplary visual sensor 232 can range from 1 cm to 50 cm. The visual sensor 232 can identify the feature points 301 when the object 300 has visible texture. If the object 300 does not have sufficient visible texture, the visual sensor 232 cannot easily identify the feature points 301 and/or cannot identify a large number of feature points 301. The error of measuring the distance D can increase. Exemplary objects 300 that do not have sufficient visible texture can include single-colored wall, smooth glass, and/or the like.

Figure 8:
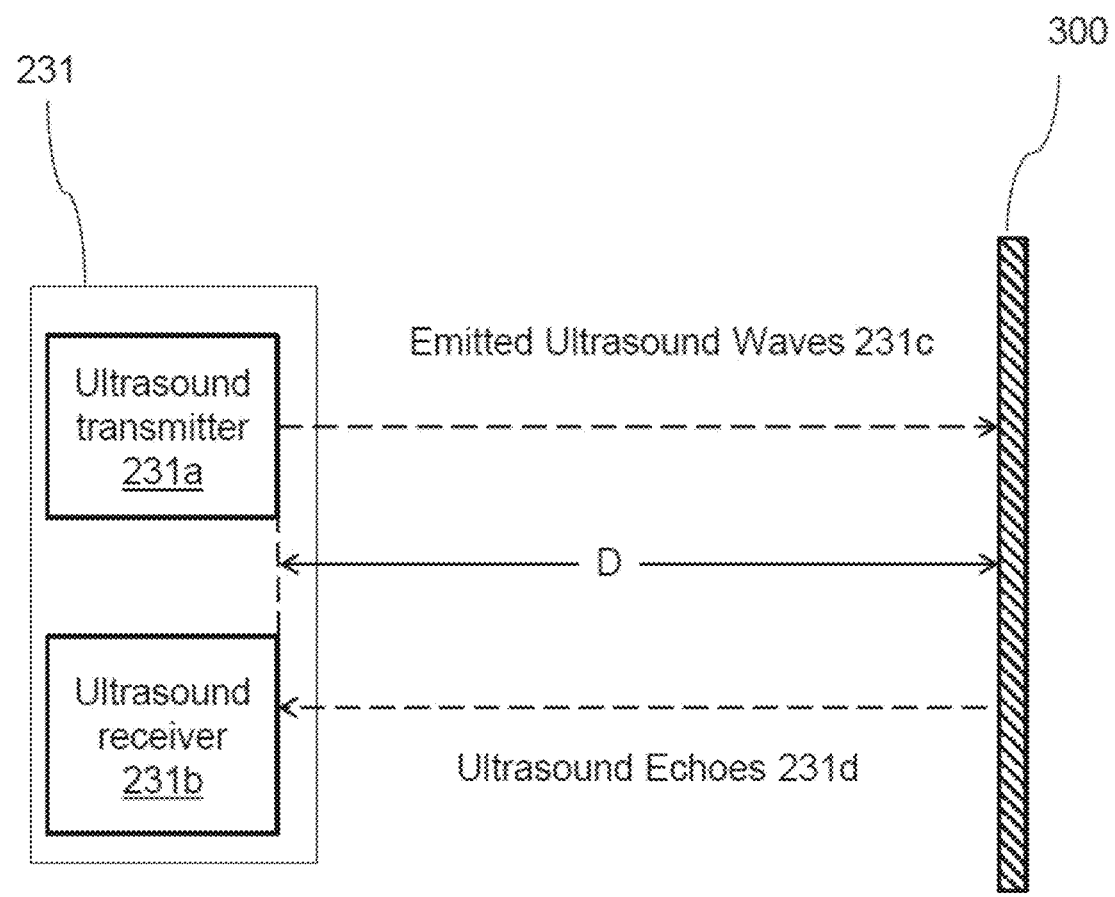
FIG. 8 is an exemplary diagram illustrating measurement of the distance of FIG. 4 using ultrasound sensing.

Turning now to FIG. 8, an ultrasound sensor 231 is shown. The ultrasound sensor 231 can emit ultrasound waves 231c at high frequency and evaluate an ultrasound echo 231d, which is received back after reflection from the object 300. Based on time lapse between sending the ultrasound waves 231c and receiving the ultrasound echo 231d, the distance D to the object 300 can be determined. The ultrasound sensor 231 can include at least one ultrasound transmitter 231a and at least one ultrasound receiver 231b. The ultrasound transmitter 231a and/or the ultrasound receiver 231b can each be an ultrasound transducer that converts electrical signals into ultrasound waves and vice versa. Exemplary ultrasound transducers include piezoelectric transducers and capacitive transducers. In some embodiments, the ultrasound sensor 231 can include an arrayed ultrasound transducer in a one-dimensional or two-dimensional configuration, enabling construction of an ultrasound depth map. The ultrasound depth map can show respective distances between the mobile platform 200 and one or more points of the object 300.

In certain embodiments, when the distance D is less than and/or equal to 5 meters, error of distance measurement by an exemplary ultrasound sensor 231 can range from 20 cm to 50 cm. For the object 300 that does not have sufficient visible texture, such as single-colored wall and/or smooth glass, the ultrasound sensor 231 can measure the distance D with high accuracy. However, for objects 300 that absorb and/or mitigate ultrasound wave, the ultrasound sensor 231 can measure the distance D with low accuracy. Exemplary objects 300 that absorb and/or mitigate ultrasound wave include certain type(s) of carpets.

Figure 9:
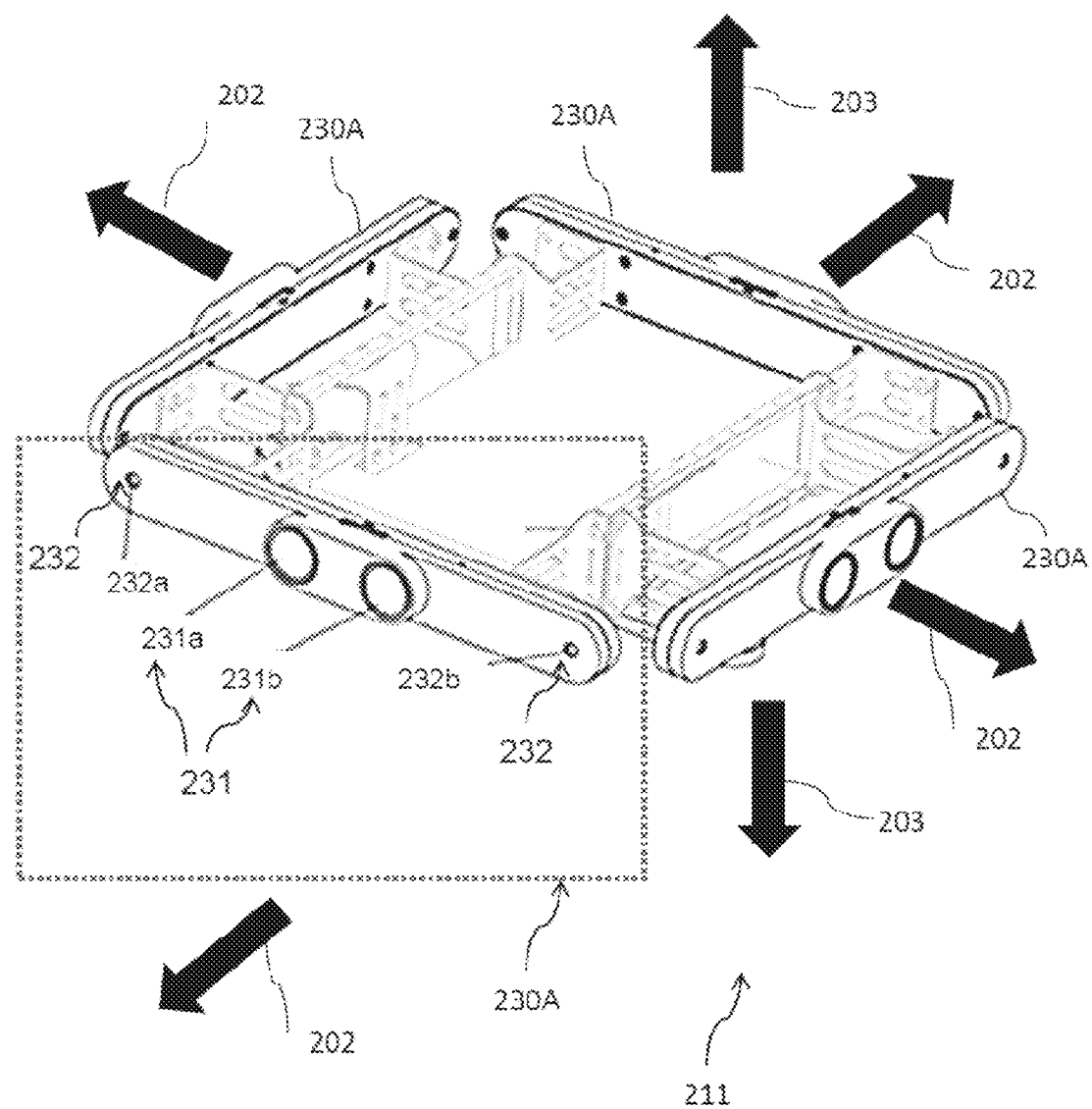
FIG. 9 is an exemplary detail drawing illustrating an embodiment of the ultrasound sensor and the visual sensor of FIG. 5.

Turning to FIG. 9, the sensors 230 can include a plurality of sensor sets 230A. Each sensor set 230A can include one or more ultrasound sensors 231 and/or one or more visual sensors 232. Each sensor set 230A can monitor a respective distance D (shown in FIG. 1). The sensor sets 230A can be arranged to face uniform and/or different directions, respectively, to monitor respective distances D in corresponding directions.

FIG. 9 shows four sensor sets 230A for measuring the distances D in four directions 202, each being parallel with and/or vertical to each other. Optionally, the sensors 230 can include a fifth and/or sixth sensor set 230A (not shown) facing directions 203 vertical to the square formed by the four sensor sets 230A. More sensor sets 230A can be added for measuring the distance D in more directions.

Although FIG. 9 shows the sensor sets 230A as being arranged in a rectangular and/or square shape, the mobile platform 200 can include any number of uniform and/or different sensor sets 230A arranged in any suitable shape, size, and/or dimension suitable for positioning on the mobile platform. For example, the sensor sets 230A can be arranged in a shape that is triangle, line, parallelogram, polygon, and/or polyhedron.

Although FIG. 9 shows the sensor set 230A as including both of ultrasound sensor 231 and visual sensor 232, the sensor set 230A can include one of the ultrasound sensor 231 and the visual sensor 232. Additionally and/or alternatively, the sensor set 230A can include one or more ultrasound sensors 231 and/or one or more visual sensors 232. An advantage of using multiple sensors and/or sensor types for measuring the distance D from the object 300 is that measurements are rendered more accurate by redundancy, and the measurements are more robust to limitations of particular sensors and/or sensor types.

Figure 10:
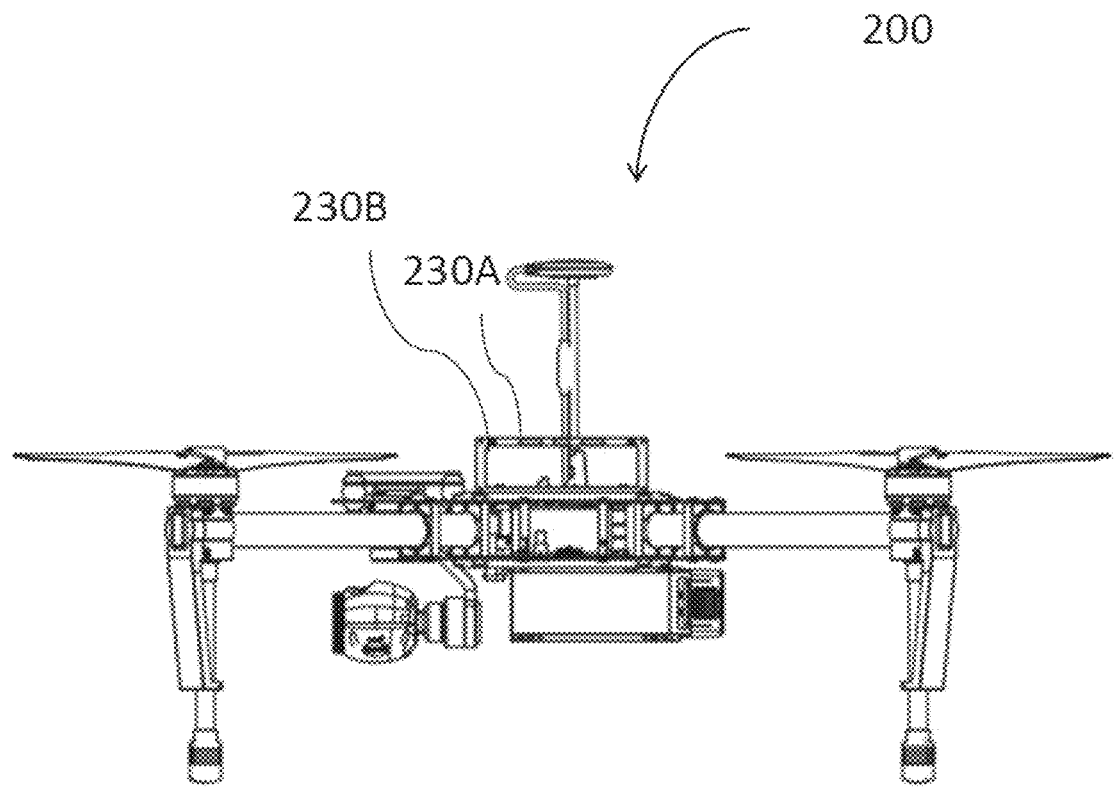
FIG. 10 is an exemplary detail drawing illustrating another alternative embodiment of the mobile platform of FIG. 4, wherein the mobile platform includes an unmanned aerial vehicle (UAV).

Turning to FIG. 10, a detail drawing of an exemplary mobile platform 200 is shown. FIG. 10 shows the mobile platform 200 as being a UAV. The sensor sets 230A can be installed on an accessory board 230B onboard the mobile platform 200.

When installed on the mobile platform 200, the sensor sets 230A can include the sensors 230 (shown in FIG. 9) for measuring respective distances D between the mobile platform 200 and the object 300 (and/or other objects or obstacles). The measured distances D can be in a plurality of directions, depending on the orientation of the sensors 230. Exemplary directions can include front, back, left, right, top, and/or bottom relative to the mobile platform 200.

Figure 11:
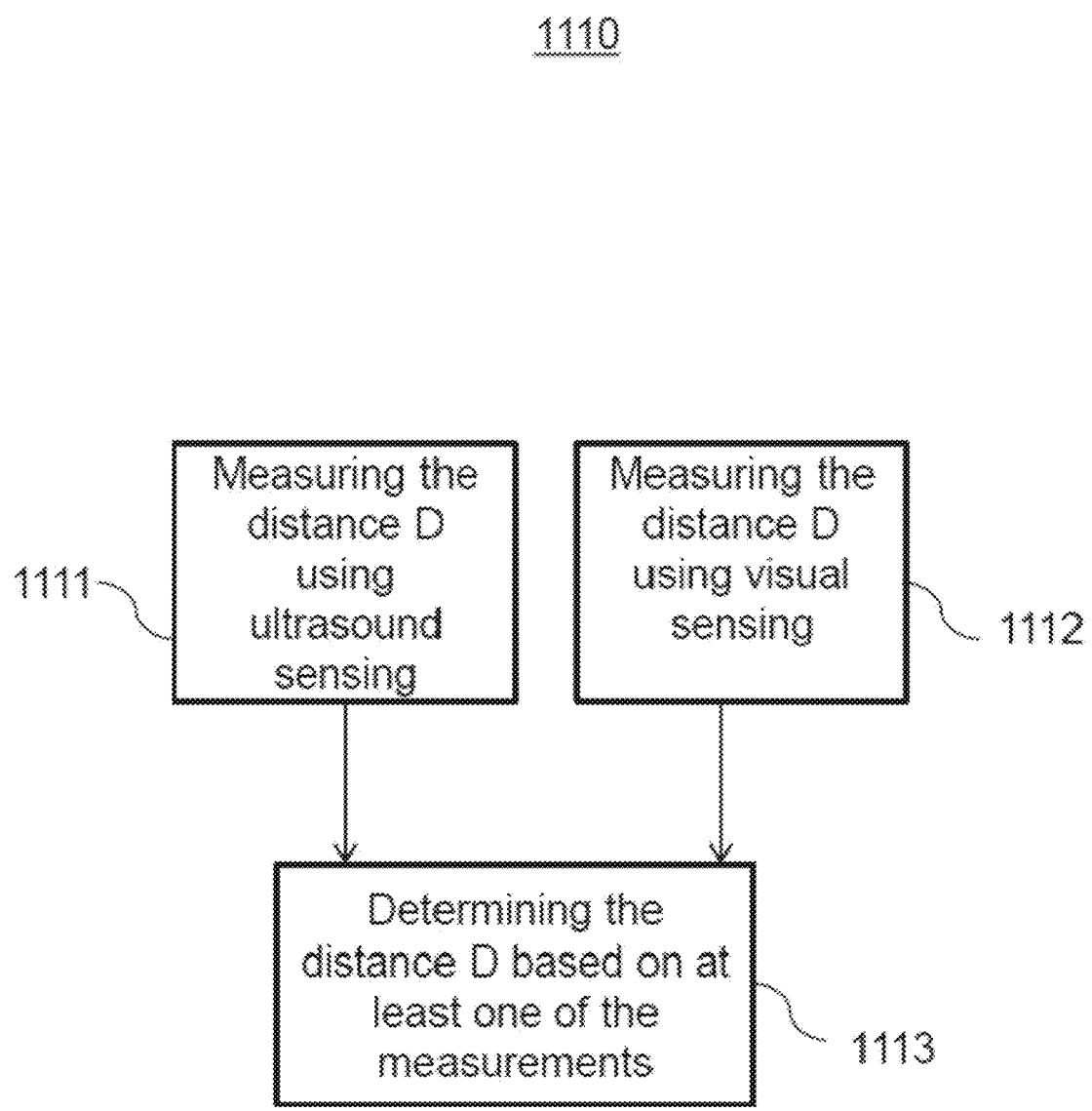
FIG. 11 is an exemplary flow chart illustrating determination of the distance of FIG. 4 based on visual sensing and ultrasound sensing.

Turning to FIG. 11, an exemplary method 1110 for determining the distance D between the mobile platform 200 and the object 300 (shown in FIG. 1) is shown as using at least one of an ultrasound measurement (also referred to herein as a first measurement) and a visual measurement (also referred to herein as a second measurement). The distance D can be measured, at 1111, using the ultrasound sensor 231 (shown in FIG. 8), to obtain the first measurement. The distance D can be measured, at 1112, using the visual sensor 232 (shown in FIG. 7), to obtain the second measurement. The distance D can be determined, at 1113, based on at least one of the first measurement and the second measurement.

The distance D can be determined by combining results of the first measurement and the second measurement in any predetermined manner. For example, the distance D can be determined to be a simple average and/or a weighted average of the first measurement and the second measurement.

For certain objects, the first measurement or the second measurement may have particularly limited accuracy. Thus, in some examples, based on characteristics of the object 300 and/or the measurement process, the distance D can be based on one of the first measurement and the second measurement.

For example, during the second measurement by the visual sensor 232, the visual sensor 232 can detect no texture of interest on the object 300. When the object 300 has the texture of interest, the visual sensor 232 can identify one or more feature points 301 in a captured image of the object 300. The number of the feature points 301 can be equal to and/or greater than a predetermined number limit. Reaching the predetermined number limit can ensure the second measurement to have a desired accuracy. Therefore, when the second measurement by the visual sensor 232 detects no texture of interest on the object 300, the distance D can be determined based on the first measurement by the ultrasound sensor 231.

In another example, during the first measurement by the ultrasound sensor 231, the ultrasound receiver 231*b* (shown in FIG. 8) can receive the ultrasound echo lower than a predetermined intensity limit. An exemplary predetermined intensity limit can be based on a selected fraction of the intensity of the ultrasound wave emitted by the ultrasound emitter 231*a*. When ultrasound echo lower than the predetermined intensity limit, the emitted ultrasound wave may have been absorbed and/or mitigated by the object 300. In that case, accuracy of the ultrasound sensor 231 can be low. Thus, when the first measurement by the ultrasound sensor 231 receives an ultrasound echo lower than the predetermined intensity limit, the distance D can be determined based on the second measurement by the visual sensor 232.

Figure 12:
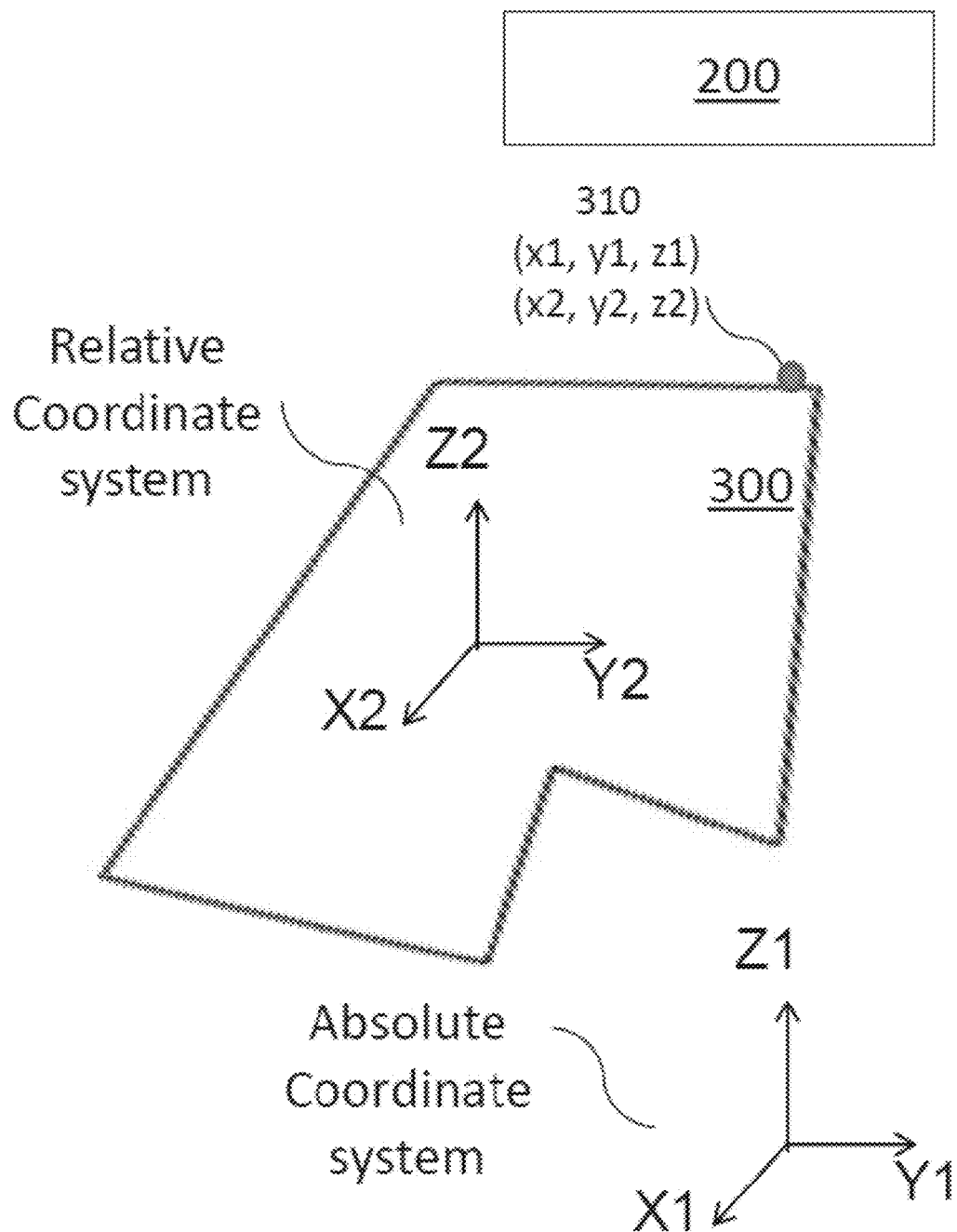
FIG. 12 is an exemplary diagram illustrating an alternative embodiment of the mobile platform of FIG. 1, wherein the mobile platform moves to a selected service point of the object.

In some examples, performing a task for a selected position on the object 300 can be desirable. Turning to FIG. 12, the mobile platform 200 can move to (or approach) a selected service point 310 of the object 300. A service point 310 of the object 300 can include a target destination where the mobile platform 200 can perform the task. In other words, the mobile platform 200 can aim to arrive at the service point 310 to perform the task. The service point 310 can have any spatial relationship with the object 300. For example, the service point 310 can be on, adjacent to, and/or underneath, the surface of the object 300. Additionally and/or alternatively, the service point 310 can be located away (or distal) from the object 300.

Additionally and/or alternatively, the object 300 can move toward the service point 310 for performing the task. However, the object 300 need not necessarily arrive at the service point 310. For example, when the service point 310 is on the surface of the object 300, the mobile platform 200 can approach (or move to be near) the service point 310 while maintaining the distance D (shown in FIG. 1) from the service point 310 (and/or the object 300). In another example, the service point 310 can be positioned at the distance D from the surface. In that case, the mobile platform 200 can move to (and/or arrive at) the service point 310.

The mobile platform 200 can locate the service point 310 according to a position of the service point 310. The position of the service point 310 can include coordinates of the service point 310 in an absolute coordinate system (or a global coordinate system). The absolute coordinate system can be a system based on which travel of the mobile platform 200 can be directed. Stated somewhat differently, the control system 210 (shown in FIG. 2) can instruct the mobile platform 200 to move to and/or arrive at a certain position, and such position can be based on the absolute coordinate system. For illustrative purposes, FIG. 12 shows the absolute coordinate system as including a Cartesian coordinate system with three coordinate axes X1, Y1, Z1, and the coordinates of the selected service point 310 as being (x1, y1, z1) in the absolute coordinate system.

The object 300 can define a relative coordinate system (or a local coordinate system). The relative coordinate system can be used for defining a spatial relationship between the selected service point 310 and the object 300. For illustrative purposes, FIG. 12 shows the relative coordinate system as including a Cartesian coordinate system with three coordinate axes X2, Y2, Z2, and the coordinates of the selected service point 310 as being (x2, y2, z2) in the relative coordinate system. The coordinates (x2, y2, z2) of the selected service point 310 in the relative coordinate system can represent the spatial relationship between the selected service point 310 and the object 300.

A given service point 310 can be defined and/or selected based on coordinates of service point 310 in the relative coordinate system, regardless of what absolute coordinate system is used. For example, a selected service point 310 can be a tip of a right wing of the object 300 when the object 300 includes an aircraft. Such selection can be made in the relative coordinate system based on the object 300.

For a given service point 310, the coordinates (x2, y2, z2) in the relative coordinate system can be fixed regardless of how the object 300 is placed in the absolute coordinate system. The coordinates (x1, y1, z1) in the absolute coordinate system can vary depending on how the object 300 is placed in the absolute coordinate system. Coordinates in the relative coordinate system and the absolute coordinate system can be referred to as relative coordinates and absolute coordinates, respectively.

Figure 13:
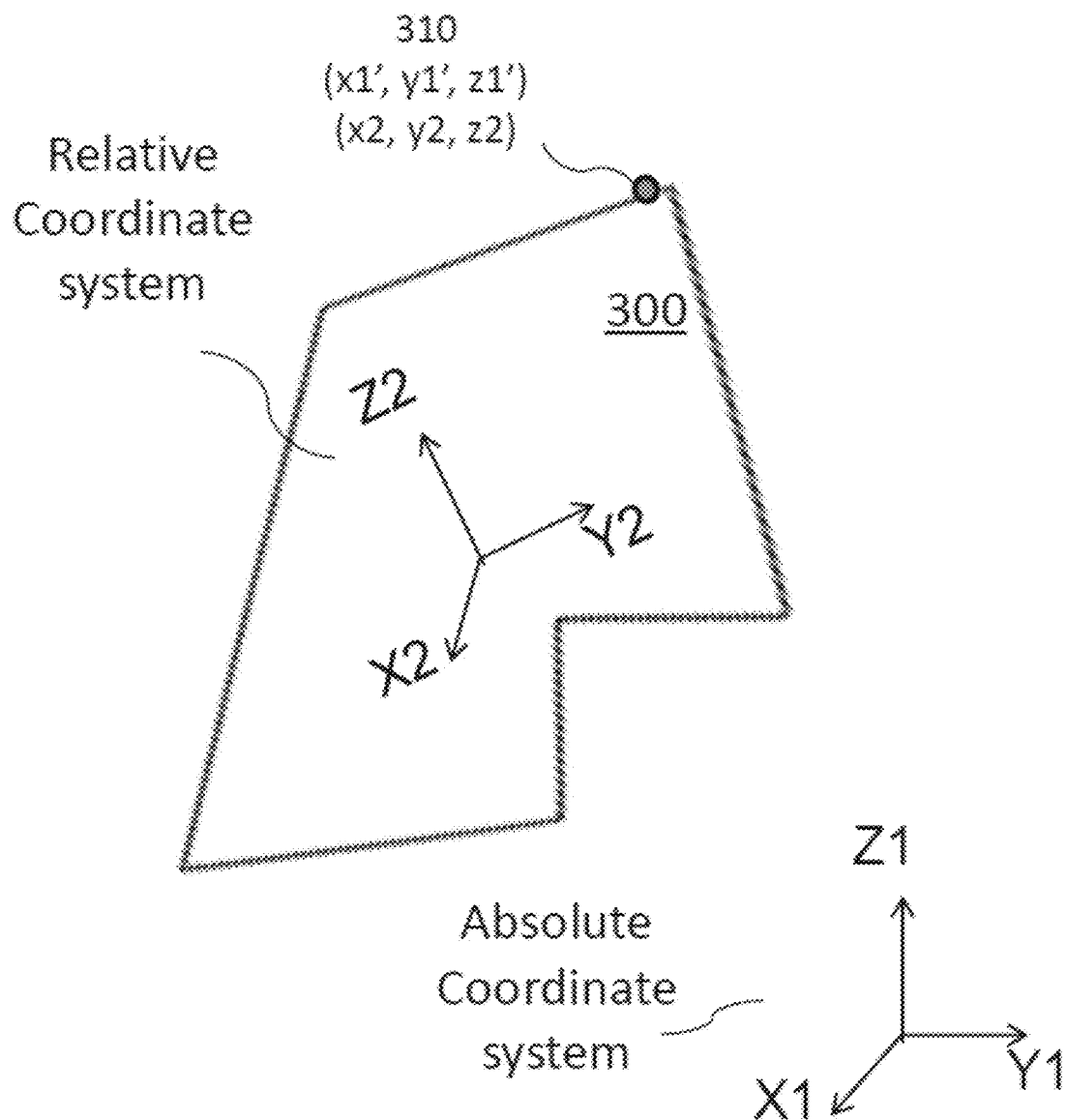
FIG. 13 is an exemplary diagram illustrating changing a position of a selected service point by changing a position or orientation of the object of FIG. 12.

Turning to both FIG. 12 and FIG. 13, position and/or orientation of the object 300 in FIG. 13 can be different from position and/or orientation of the object 300 in FIG. 12. The difference can occur when the object 300 makes a movement. For example, the object 300 can include an aircraft, which may be positioned at a maintenance facility differently each time. In another example, the object 300 can move continuously while being serviced by the mobile platform 200.

Correspondingly, the relative coordinate system (or the three coordinate axes X2, Y2, Z2) in FIG. 13 can be different from the relative coordinate system in FIG. 12. The absolute coordinate system with the three coordinate axes X1, Y1, Z1 can remain unchanged in FIG. 12 and FIG. 13.

Therefore, in FIG. 13, the coordinates of the selected service point 310 in the relative coordinate system can still be (x2, y2, z2). However, the coordinates of the selected service point 310 in the absolute coordinate system have changed to (x1', y1', z1').

For the selected service point 310 having coordinates (x2, y2, z2) in the relative coordinate system, the coordinates (x1, y1, z1) in the absolute coordinate system can be obtained based on a transformation relationship between the absolute and the relative coordinate systems. Stated somewhat differently, for the given service point 310, the transformation relationship is a relationship between the absolute coordinates and the relative coordinates. The absolute coordinates (x1, y1, z1) can be obtained based on the relative coordinates (x2, y2, z2) when the transformation relationship is known.

An exemplary transformation relationship can include the following expressions:

$$\begin{cases} x1 = a1 \times x2 + b1 \times y2 + c1 \times z2 \\ y1 = a2 \times x2 + b2 \times y2 + c2 \times z2 \\ z1 = a3 \times x2 + b3 \times y2 + c3 \times z2 \end{cases} \quad \text{Equation (5)}$$

where a1, b1, c1, a2, b2, c2, a3, b3, and c3 are transformation coefficients for transformation relationship between the absolute and the relative coordinate systems. The transformation relationship can be fixed when the object 300 is stationary, and/or can change when the object 300 moves.

In some embodiments, when the position and orientation of the object 300 in the absolute coordinate system is determined, the transformation relationship can be determined. Therefore, the coordinates (x1, y1, z1) can be based on the position and orientation of the object 300 in the absolute coordinate system.

The transformation relationship can be determined in any manner. For example, the transformation relationship can be determined using a method that can provide values of the transformation coefficients. In certain examples, the transformation relationship can be determined based on one or more control points. Stated somewhat differently, the position and orientation of the object 300 can be based on one or more control points. A control point can refer to a point having one or more coordinates that are at least partially known so as to allow calculation of the transformation relationship.

Figure 14:
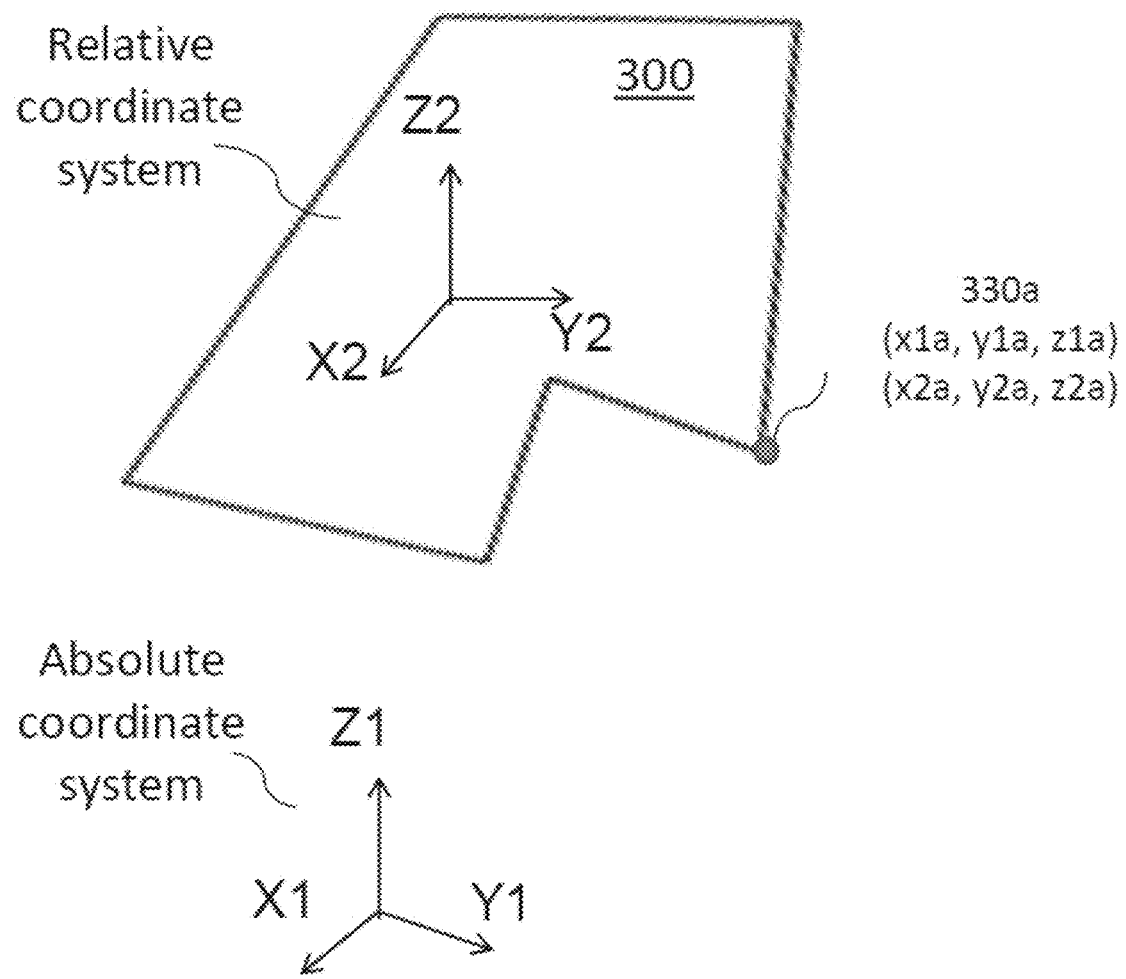
FIG. 14 is an exemplary diagram illustrating determination of a position of the object of FIG. 12 via a control point.

Turning to FIG. 14, a position of the object 300 can be determined via at least one control point 330a. The control point 330a can have a predetermined spatial relationship with the object 300, expressed by the relative coordinates (x2a, y2a, x2a). The control point 330a can have absolute coordinates (x1a, y1a, x1a).

The position of the object 300 can be expressed via the absolute coordinates (x1a, y1a, x1a). When the position of the object 300 is determined, the mobile platform 200 can locate the object 300. However, for the mobile platform 200 to locate the selected service point 310, the orientation of the object 300 may need to be determined.

Figure 15:
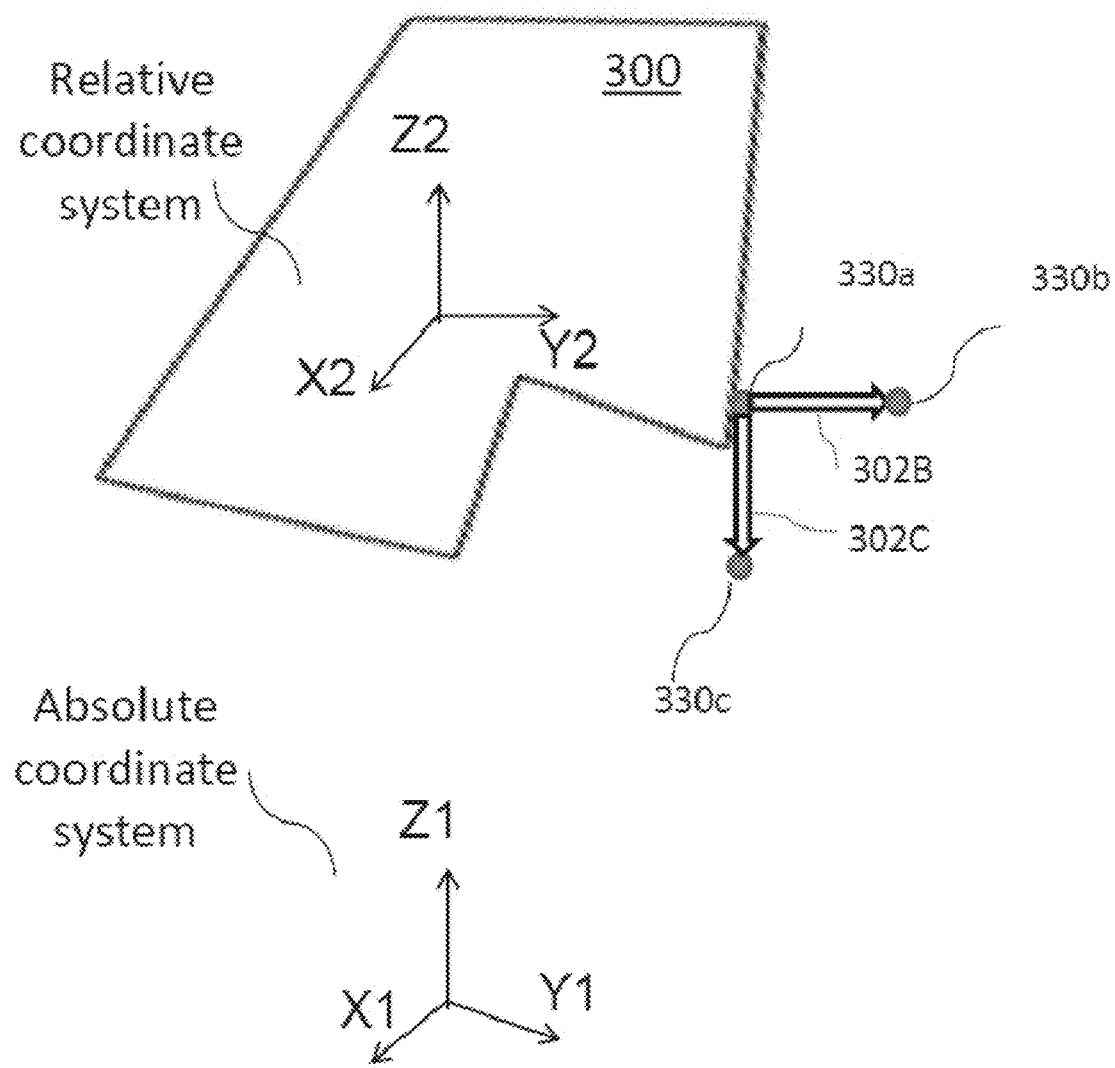
FIG. 15 is an exemplary diagram illustrating determination of an orientation of the object of FIG. 12 via one or more control points.

An orientation of the object 300 can be determined via one or more control points. Turning to FIG. 15, the control points can include the control point 330a, and control points 330b, 330c. The control point 330b, 330c can have respective predetermined spatial relationships with the object 300, expressed by the relative coordinates (x2b, y2b, x2b), (x2c, y2c, x2c). The control point 330b can have absolute coordinates (x1b, y1b, x1b), (x1c, y1c, x1c).

An orientation 302 of the object 300 can include orientations 302B, 302C. The orientation 302B, 302C can be vectors. The orientation 302B can be expressed by relative coordinates (x2b−x2a, y2b−y2a, z2b−z2a) and/or absolute coordinates (x1b−x1a, y1b−y1a, z1b−z1a). The orientation 302C can be expressed by relative coordinates (x2c−x2a, y2c−y2a, z2c−z2a) and/or absolute coordinates (x1c−x1a, y1c−y1a, z1c−z1a). Therefore, via the control points 330a-330c, how the object 300 orients in the absolute coordinate system can be determined.

Based on the position and/or the orientation of the object in the absolute coordinate system, the mobile platform 200 can locate the selected service point 310.

Stated somewhat differently, the transformation relationship between the absolute and relative coordinate systems can be obtained. For example, via Equation (5), each of the control points 330a at (x1a, y1a, x1a) and (x2a, y2a, x2a), 330b at (x1b, y1b, x1b) and (x2b, y2b, x2b), and 330c at (x1c, y1c, x1c) and (x2c, y2c, x2c) can provide three equations. Nine equations can be used for solving the transformation coefficients a1, b1, c1, a2, b2, c2, a3, b3, and c3. The transformation relationship can thus be obtained.

Figure 16:
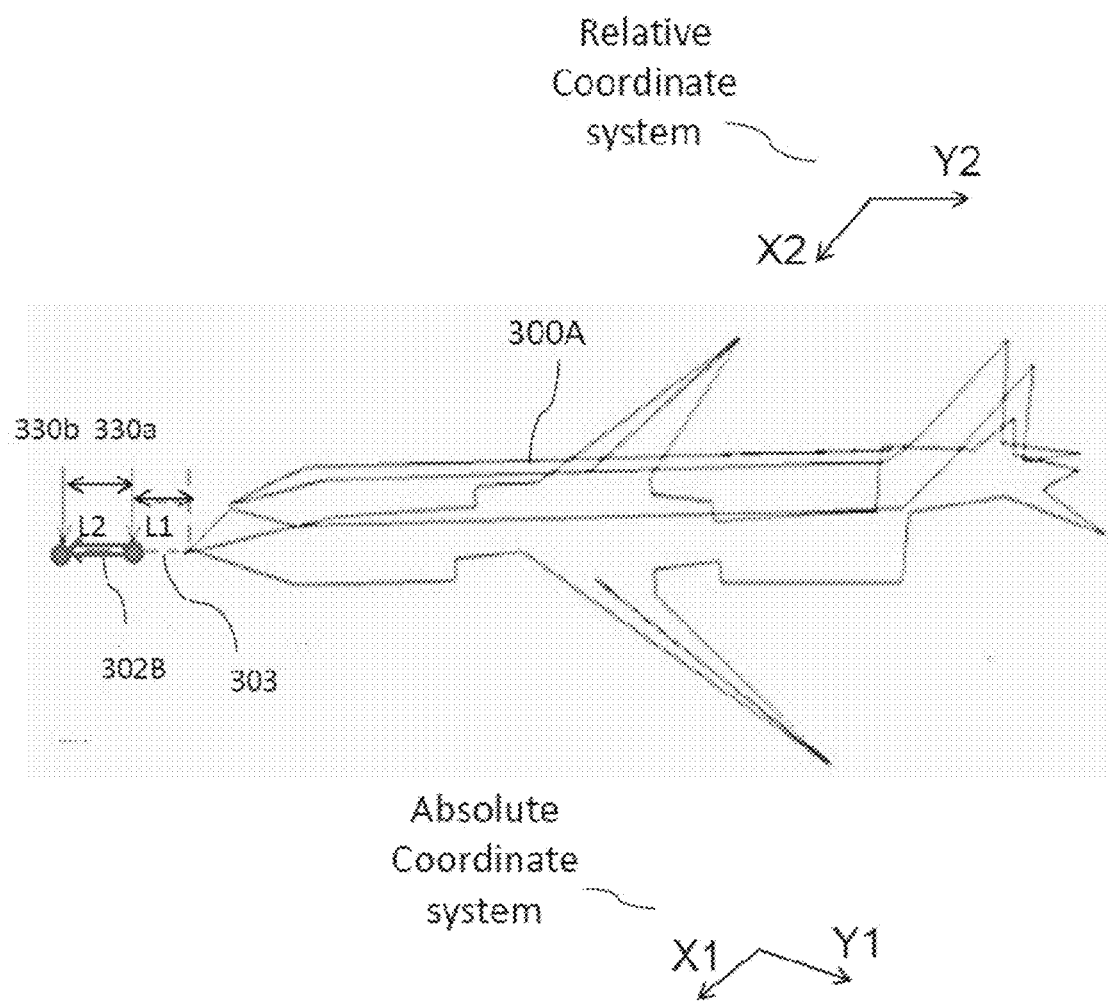
FIG. 16 is an exemplary detail drawing illustrating determination of a position and an orientation of the object of FIG. 12, wherein the position and the orientation of the object are determined in two dimensions.

Turning to FIG. 16, a detail drawing of exemplary control points 330a, 330b is shown in relation with the object 300. FIG. 16 shows the object 300 as being an aircraft 300A. FIG. 16 shows the control point 330a as a point at a predetermined distance L1 ahead of the front-most point of the aircraft 300A along a central line 303 of the plane. FIG. 16 shows the control point 330b as a point at a predetermined distance L2 ahead of the control point 330a along the central line 303. L1 and L2 can be uniform and/or different. FIG. 16 shows the orientation 302B as in a frontward direction of the aircraft 300A.

As shown in FIG. 16, three-dimensional orientation of the object 300 can be at least partially known. For example, the aircraft 300A can be leveled with ground. Thus, a two-dimensional transformation relationship can be sufficient to describe position and/or orientation of the aircraft 300A. That is, the absolute and relative coordinate systems can each include two axes (X1, Y1), (X2, Y2), respectively.

For example, the transformation relationship can have the following expressions:

$$\begin{cases} x1 = a1 \times x2 + b1 \times y2 \\ y1 = a2 \times x2 + b2 \times y2 \end{cases} \quad \text{Equation (6)}$$

Therefore, via the control points 330a, 330b, the position and orientation of the aircraft 300A in the absolute coordinate system can be determined.

Based on the position and/or the orientation of the object in the absolute coordinate system, the mobile platform 200 (shown in FIG. 12) can locate the selected service point 310.

Stated somewhat differently, the transformation relationship between the absolute and the relative coordinate systems can be obtained. For example, via Equation (6), the control points 330a at (x1a, y1a) and (x2a, y2a), 330b at (x1b, y1b) and (x2b, y2b) can used for solving the transformation coefficients a1, b1, a2, and b2. The transformation relationship can thus be obtained.

Figure 17:
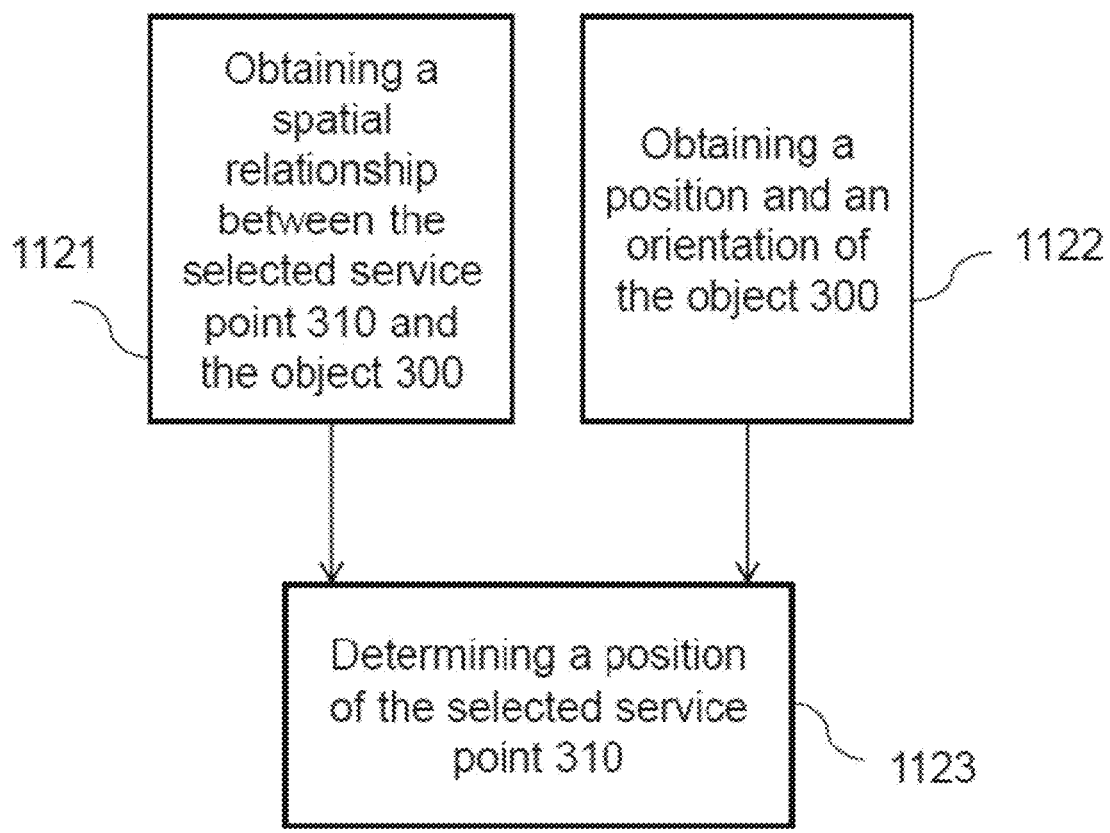
FIG. 17 is an exemplary flow chart illustrating determination of a position of the selected service point of FIG. 12.

Turning to FIG. 17, an exemplary method 1120 for determining the position of the selected service point 310 (shown in FIG. 12) is shown. The spatial relationship between the selected service point 310 and the object 300 can be obtained, at 1121. For example, the spatial relationship between the selected service point 310 and the object 300 can be obtained according to a model (not shown) of the object 300. For example, the spatial relationship can be expressed as the coordinates (x2, y2, z2) of the selected service point 310 in the relative coordinate system (shown in FIG. 12).

The model can refer to a replica of the object 300 that partially and/or completely duplicates the shape, size and/or dimension of the object 300. An exemplary model can include a computerized two-dimensional and/or three-dimensional model.

The position and the orientation of the object 300 can be obtained, at 1122. For example, the position can be obtained via the control point 330a (shown in FIG. 14). For example, the orientation of the object 300 can be obtained via the control points 330a, 330b, and/or 330c (shown in FIG. 15 and FIG. 16).

The control points 330a-330c can have respective predetermined spatial relationships with the object 300. The predetermined spatial relationships can be expressed using relative coordinates, which can be obtained based on the model of the object 300.

Additionally and/or alternatively, the control points 330a-330c can have respective absolute coordinates, which can be obtained via any navigation methods. An exemplary navigation method can include Global Positioning System (GPS). For example, a position tracking device (such as a GPS device) can be positioned at a selected control point 310 and measure the absolute coordinates. The position tracking device can be placed at the selected control point by any methods and/or tools, such as human operator, a mechanical arm, and/or a lift.

To improve accuracy of measuring the absolute coordinates with the position tracking device, spacing between control points and/or service points can be greater than a predetermined spacing limit. For example, the L1 and/or L2 (shown in FIG. 16) can be greater than the predetermined spacing limit. Thus, the position tracking device can avoid mistakenly identifying two points (such as control points 330a, 330b) as one single point. An exemplary predetermined spacing limit can be greater than and/or equal to 1 meter.

The position of the selected service point 310 can be determined, at 1123, based on the spatial relationship between the selected service point 310 and the object 300, and/or the transformation relationship between the relative and absolute coordinate systems.

Although Cartesian coordinate system is used for illustrating the absolute and relative coordinate systems, the absolute and/or relative coordinate systems can include any uniform and/or different types of coordinate systems. Exemplary coordinate systems can include cylindrical coordinate system, spherical coordinate system, and/or geographic coordinate system.

Although FIG. 14 and FIG. 15 illustrates the control point 330a as being used for determining both the position and orientation of the object 300, the position and orientation of the object 300 can be respectively based on any uniform and/or different control points. FIG. 14 and FIG. 16 show that the position of the object 300 can be determined via one control point. FIG. 15 and FIG. 16 show that the orientation of the object 300 can be determined via three and two control points, respectively. However, the position and/or the orientation of the object 300 can be determined via any number of control point(s). The number of control points for determining position and the orientation of the object 300 can be uniform and/or different.

Figure 18:
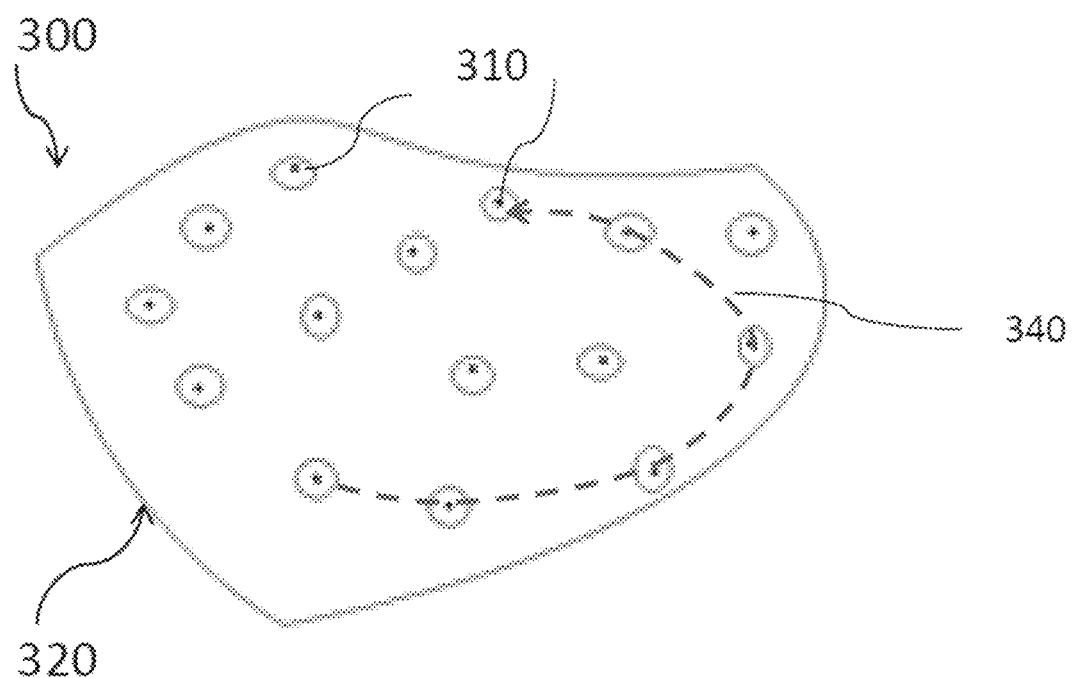
FIG. 18 is an exemplary diagram illustrating the object of FIG. 12, wherein a travel path is provided for the mobile platform.

Turning to FIG. 18, an exemplary region 320 of interest of object 300 is shown. The region 320 can have one or more service points 310 thereon. The mobile platform 200 can move along a travel path 340 to the selected service point 310. When the region 320 has one or more service points 310 thereon, the travel path 340 can connect a plurality of selected service points 310.

The mobile platform 200 (shown in FIG. 12) can move along the travel path 340 to traverse the selected service points 310, and perform the task for at least one of the selected service points 310. For example, when the mobile platform 200 includes a UAV, the mobile platform 200 can fly along the travel path 340. The travel path can be predetermined, fixed, and/or dynamically adjusted as the mobile platform 200 travels and/or performs the task.

Figure 19:
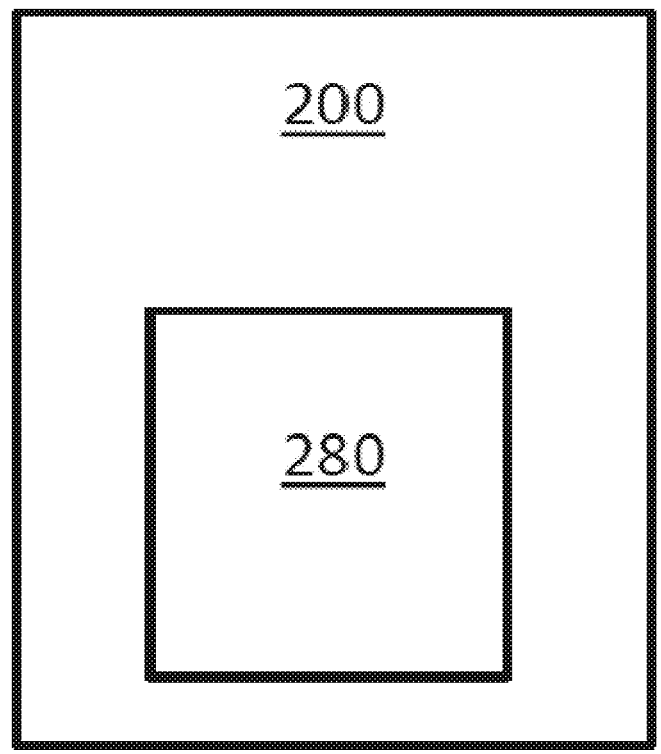
FIG. 19 is an exemplary diagram illustrating another alternative embodiment of the mobile platform of FIG. 1, wherein the mobile platform includes a differential global positioning system (DGPS) module.
Figure 19:
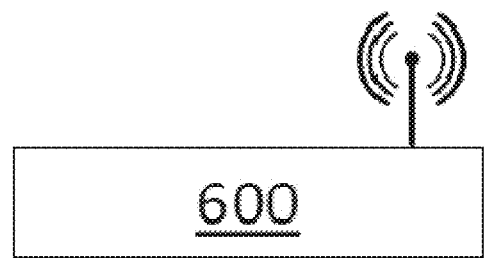

Turning to FIG. 19, the mobile platform 200 can include a position tracking device 280 for determining a position of the mobile platform 200. An exemplary position tracking device 280 can include a global positioning system (GPS) module and/or a differential GPS (or DGPS) module (not shown).

When the position tracking device 280 includes the DGPS module, the position tracking device 280 can operate to communicate with a base station 600. The base station 600 can include a GPS receiver set up on a precisely known geographic location. For example, in the U.S. and Canada, the base station 600 can include a DGPS base station system operated by the United States Coast Guard (USCG) and Canadian Coast Guard (CCG). The DGPS base station system can operate to communicate with the position tracking device 280 on longwave radio frequencies between 285 kHz and 325 kHz near major waterways and harbors.

The base station 600 can calculate its own position based on satellite signals and compare the calculated location to the known location. A difference between the calculated location and the known location can provide a differential correction. The base station 600 can thus broadcast the differential correction to the position tracking device 280 automatically and/or in response to the position tracking device 280.

The base station 600 can communicate with the position tracking device 280 via any wired and/or wireless communication methods. Exemplary method can include radio frequency (RF) communication.

When the position tracking device 280 measures the position of the position tracking device 280 and/or the mobile platform 200, the position tracking device 280 can apply the differential correction to correct GPS data recorded by the position tracking device 280. The GPS data after correction are thus DPGS signals. After being corrected, GPS data of the position of the mobile platform 200 can have high accuracy. For example, without being corrected, a GPS can measure the position of the mobile platform 200 with an error of about 2 meters. When being corrected, the position tracking device 280 can measure the position of the mobile platform 200 with an error as small as 10 cm. Therefore, the mobile platform 200 can move to selected positions with high accuracy.

Although FIG. 19 shows the position tracking device 280 as communicating with one base station 600 for purpose of illustration, the position tracking device 280 can communicate with any predetermined number of uniform and/or different base stations 600. Although FIG. 19 shows the base station 600 as communicating with the position tracking device 280, the position tracking device 280 does not necessarily receive the differential correction from a base station 600. Additionally and/or alternatively, the position tracking device 280 can receive a differential correction from one or more satellites. For example, a Wide-Area DGPS (WADGPS) and/or Satellite Based Augmentation System can include one or more ground-based base stations located at accurately surveyed points. The base stations 600 can obtain data such as the differential correction. The base stations 600 can take measurements of one or more of the satellites, the satellite signals, and/or other environmental factors that may impact the signal received by the position tracking device 280. The base stations 600 can send results of the measurements and/or the differential correction to one or more satellites. The satellites can broadcast the correction information to the position tracking device 280.

Figure 20:
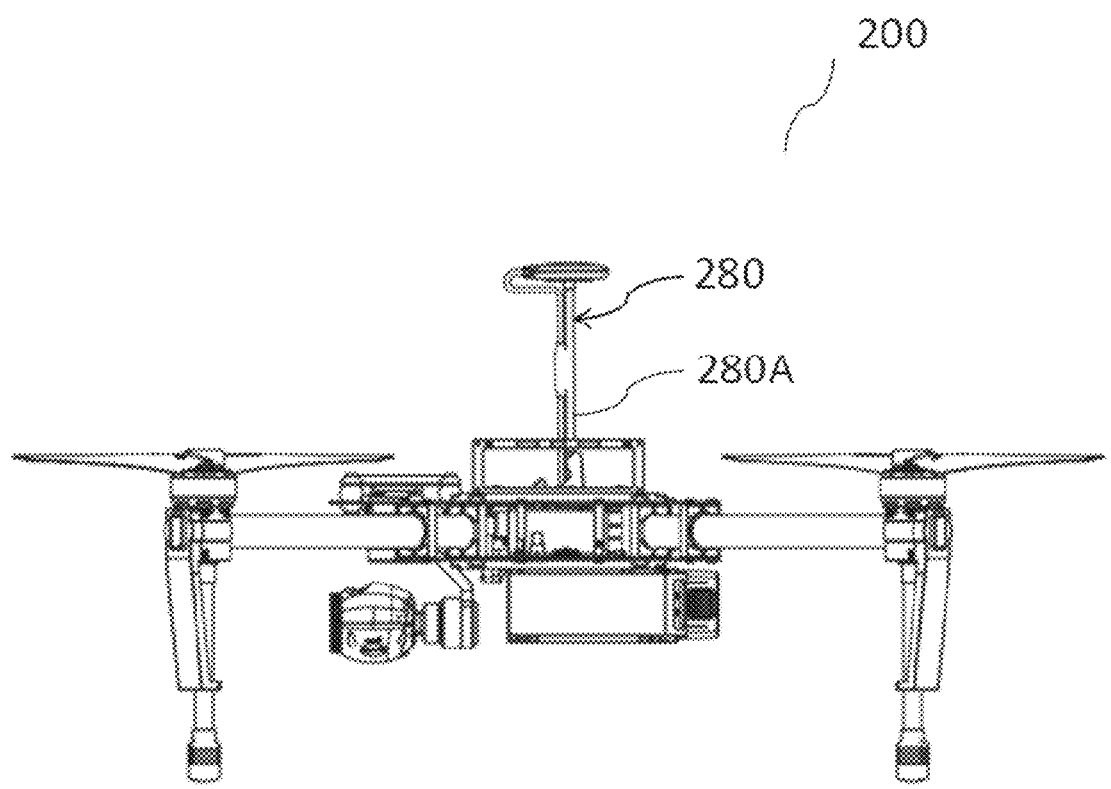
FIG. 20 is an exemplary detail drawing illustrating an alternative embodiment of the mobile platform of FIG. 19, wherein the mobile platform includes a UAV.

Turning to FIG. 20, a detail drawing of the mobile platform 200 is shown. FIG. 20 shows the mobile platform 200 as being a UAV. The position tracking device 280 is shown to include a DGPS module 280A that is installed onboard the mobile platform 200.

In certain embodiments, the base station 600 (shown in FIG. 19) can be portable and can include a GPS receiver. The base station 600 can be set up on a selected location. The location for setting up the base station 600 can be accurately surveyed and recorded as the known location. In certain embodiments, the base station 600 can communicate with the DGPS module 280A via 433 MHz RF signals. By using a portable base station 600, an operator can advantageously operate the UAV in any location without being unlimited to locations of fixed base stations 600.

Figure 21:
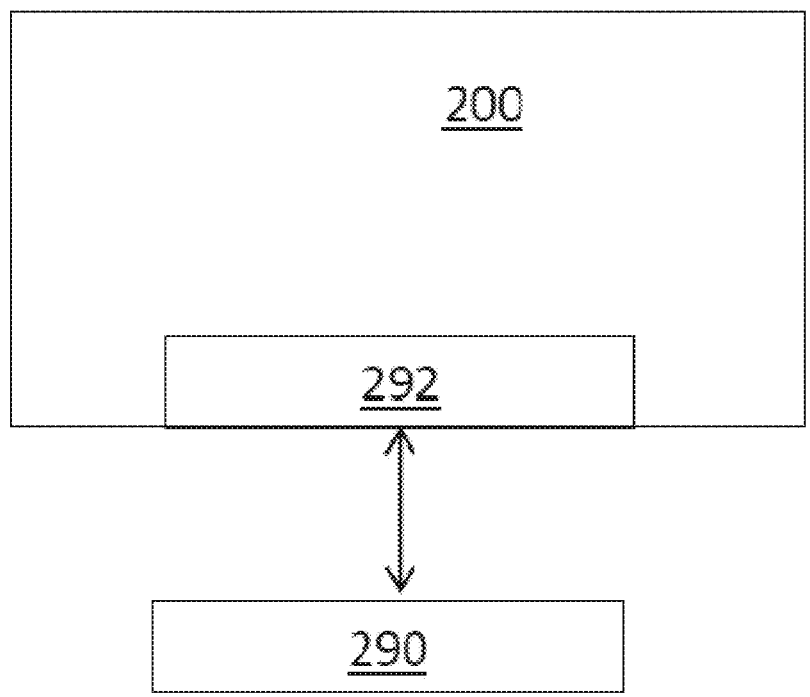
FIG. 21 is an exemplary diagram illustrating an alternative embodiment of the mobile platform of FIG. 1, wherein the mobile platform includes a payload.

Turning to FIG. 21, the mobile platform 200 is shown as being capable of being coupled with a payload 290. The payload 290 can perform the task for the object 300. For example, the payload 200 can perform the task for the selected service point 310 (shown in FIG. 12).

Optionally, the payload 290 can be coupled with the mobile platform 200 via a carrier 292 as shown in FIG. 1. The carrier 292 can permit the payload 290 to rotate about one or more axes, such as three axes X (or pitch) axis, Z (or roll) axis, and Y (or yaw) axis, relative to the mobile platform 200. Thus, the payload 290 can be oriented in any of a plurality of directions even if orientation of the mobile platform 200 remains unchanged.

Optionally, the carrier 292 can stabilize the payload 290 against motion of the mobile platform 200. For example, the carrier 292 can provide damping function to reduce vibration of the payload 290 due to motion of the mobile platform 200. Additionally and/or alternatively, the carrier 292 can include one or more sensors for measuring unwanted movement of the payload 290 due to position drifting of the mobile platform 200. The carrier 292 can thus compensate for the movement by adjusting orientation and/or position of the payload 290. Thus, even with vibration, shaking and/or drifting of the mobile platform 200, the payload 200 can remain stable and perform the task for the selected service point 310 with higher positioning accuracy.

Although FIG. 21 shows the mobile platform 200 as including one payload 290 and one carrier 292, the mobile platform 200 can include any number of uniform and/or different payloads 290. The payloads 290 can be coupled to the mobile platform 200 via any number of uniform and/or different carriers 292. Certain payloads 290 The payloads 290 can be coupled to the mobile platform 200 without a carrier 292.

The mobile platform 200 can perform one or more uniform and/or different tasks by using the payloads 290. In certain embodiments, the mobile platform 200 can perform each of the uniform and/or different tasks by using a respective payload 290. Additionally and/or alternatively, a payload 290 can perform one or more uniform and/or different tasks. Additionally and/or alternatively, multiple payloads 290 can collaboratively perform a task.

Figure 22:
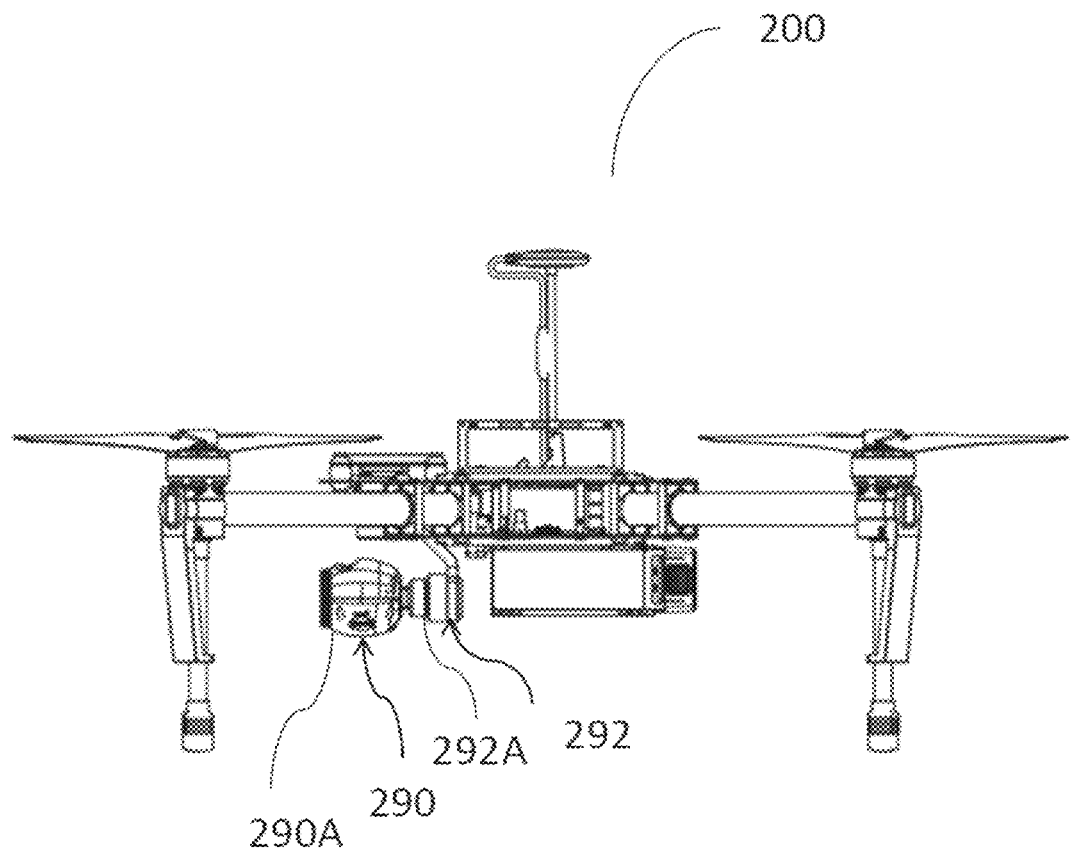
FIG. 22 is an exemplary detail drawing illustrating an alternative embodiment of the mobile platform of FIG. 21, wherein the mobile platform includes a UAV.

Turning to FIG. 22, a detail drawing of the mobile platform 200 is shown. FIG. 22 shows the mobile platform 200 as being a UAV. The payload 290 can include a camera 290A. The camera 290A can capture still and/or video images of the object 300.

The carrier 292 can include a gimbal 292A. In certain embodiments, the gimbal 292A can include a three-axis gimbal. The mobile platform 200 can control the gimbal 292A to adjust orientation of the camera 290A. Thus, when the mobile platform 200 suspends in air with orientation fixed, the camera 290A can be oriented in any of the plurality of directions to capture images of the object 300 in a plurality of perspectives.

Figure 23:
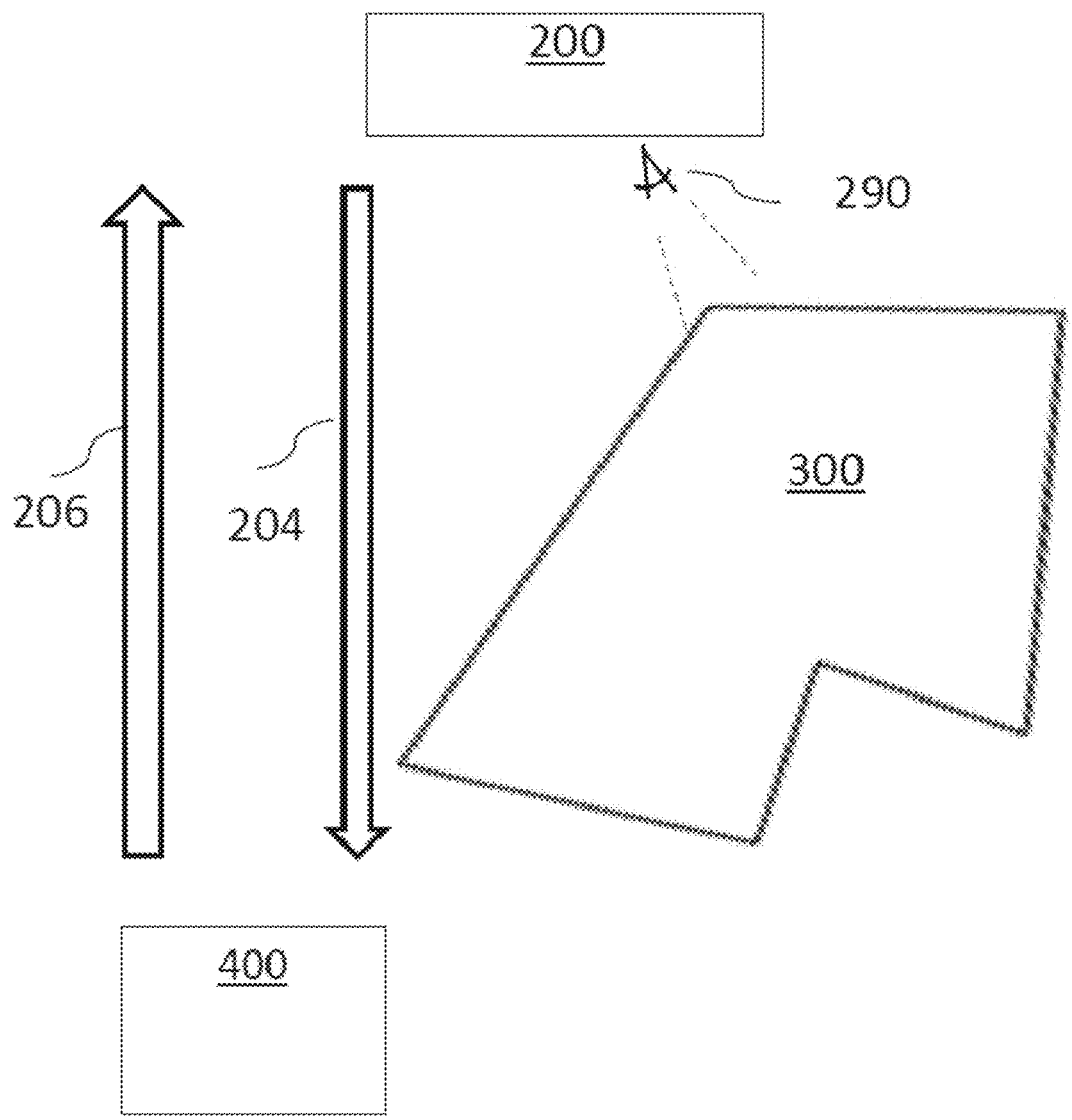
FIG. 23 is an exemplary diagram illustrating another alternative embodiment of the mobile platform of FIG. 1, wherein the mobile platform transmits data to a computer.

Turning to FIG. 23, the mobile platform 200 can communicate with a task manager 400. The task manager 400 can include a computer device. An exemplary task manager 400 can include a mobile phone, a smart phone, a tablet computer, a personal computer, a server computer, and/or the like. Communication between the mobile platform 200 and the task manager 400 can be wired and/or wireless. For example, the task manager 400 and/or the mobile platform 200 can each include RF circuitry (not shown). The RF circuitry can include, but be not limited to, an antenna, at least one amplifier, a tuner, one or more oscillators, a user subscriber identity module (SIM) card, a transceiver, a coupler, LNA (i.e., Low Noise Amplifier), a duplexer, etc. The RF circuitry can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

When performing the task using the payload 290, the mobile platform 200 can obtain data 204. For example, when the payload 290 includes the camera 290A (shown in FIG. 22), the data 204 can include the images captured by the camera 290A.

Additionally and/or alternatively, when the payload 290 includes an instrument for measuring a property of the object 300, the data 204 can thus include the measurement result obtained by the instrument. Exemplary measurement can include directing light to the surface of the object 300 to measure a property, such as optical reflectance, of the surface.

The mobile platform 200 can provide the data 204 to the task manager 400. The task manager 400 can process and/or analyze the data 204. Based on the processing and/or analysis, the task manager 400 can determine subsequent task for the mobile platform 200 to perform, and generate a command 206 accordingly. An exemplary command 206 can instruct the mobile platform 200 to update the task and perform the updated task. Additionally and/or alternatively, the exemplary command 206 can instruct the mobile platform 200 to adjust orientation of the payload 290 (shown in FIG. 21). Additionally and/or alternatively, the exemplary command 206 can instruct the mobile platform 200 to move to a different position, pause the task, and/or stop the task.

Figure 24:
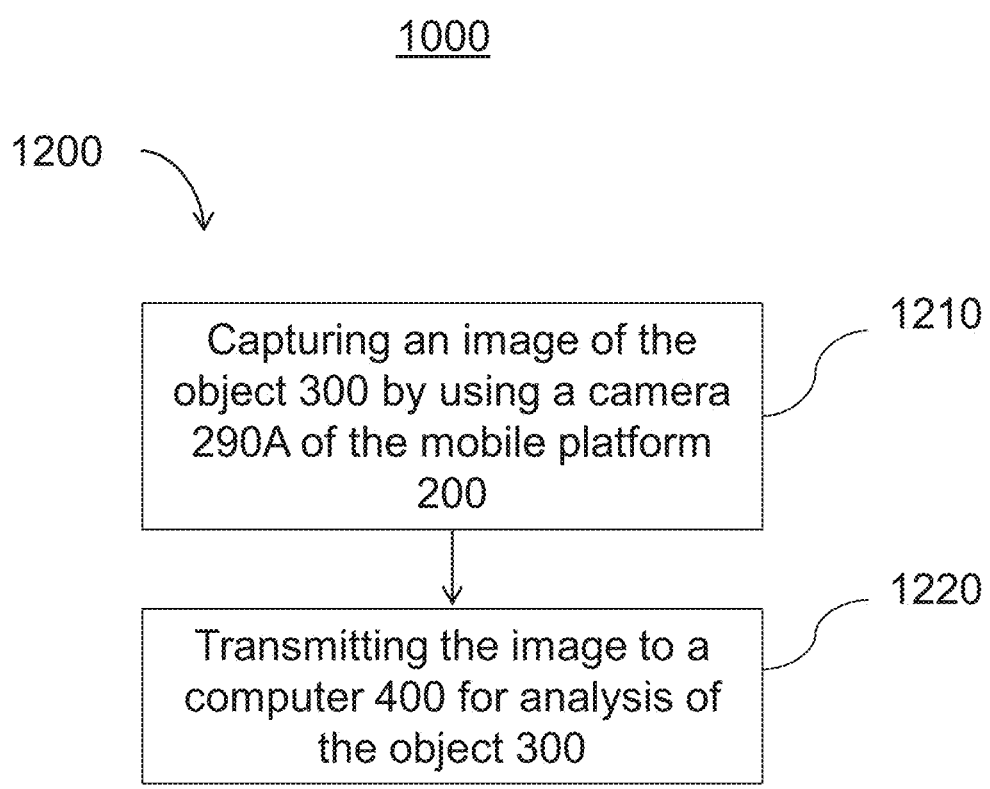
FIG. 24 is an exemplary flow chart illustrating an alternative embodiment of the method of FIG. 3, wherein the mobile platform captures an image of the object.

Turning to FIG. 24, an exemplary method 1200 for servicing the object 300 using the mobile platform 200 is shown. An image of the object 300 can be captured, at 1210, by using the camera 290A (shown in FIG. 22) of the mobile platform 200. For example, the camera 290A can capture the image of the surface of the object 300.

The image can be transmitted, at 1220, to the task manager 400 (shown in FIG. 23) for analysis of the object 300. For example, when the camera 290A captures the image of the surface of the object 300, analysis of the object 300 can include analysis of the surface of the object 300 based on the images.

For example, the task manager 400 can present and/or display the image for an operator to visually inspect the object 300. Additionally and/or alternatively, the task manager 400 can transmit the image to a computer system of a third party for analysis, inspection, and/or storage.

Additionally and/or alternatively, the task manager 400 can perform one or more image feature recognition (and/or feature detection) methods. A feature can refer to a part of interest in the image. An exemplary feature can include edge, corner, point, and/or ridge. The feature can have a selected characteristic, such as shape, size, dimension, color, texture, and/or the like. Selection of the feature can depend on type of task that the mobile platform 200 is configured to perform.

The feature recognition method can determine whether a feature of a selected type exists at a point in the image. An exemplary feature recognition method can include edge detection, and/or image binarization.

The task manager 400 can generate the command 206 (in FIG. 23) based on the analysis of the image. For example, when the task manager 400, the third party and/or the human detects a feature of interest in the image, the task manager 400 can select the feature and send the command 206 for capturing a zoom-in image of the selected feature. Additionally and/or alternatively, the task manager 400 can send the command 206 for adjusting the orientation of the camera 290A to capture the selected feature at a different perspective in order to better observe the feature.

By using the disclosed methods, automation and efficiency of servicing the object 300 can advantageously be improved. For example, to inspect the surface of the object 300, the mobile platform 200 can repeatedly return to a selected position of the object 300 to conduct repeated inspection, even when position and/or orientation of the object 300 can be different at every time of inspection.

Additionally and/or alternatively, the mobile platform 200 can advantageously travel close to the object 300 and avoid collision with object 300. The mobile platform 200 can thus capture images of the object 300 at a close distance. The images can thus present features and/or topography of the surface of the object 300 at a sufficiently high clarity and/or resolution. The surface can thus be inspected by analyzing the images.

Additionally and/or alternatively, the mobile platform 200 can transmit the images to the task manager 400 for analysis. The task manager 400 can be located remotely from the object 300. The image can be analyzed in real time when the mobile platform 200 captures the images. Additionally and/or alternatively, feedback based on the image can be generated in real time, and the task manager 400 can generate the command 206 according to the feedback. The mobile platform 200 can thus operate based on the command 206, to timely obtain new images with adjusted content and/or quality.

Additionally and/or alternatively, the real-time analysis and/or feedback can be achieved with and/or without human intervention or involvement. Even if a human analyzes the image, the human does not need to be present at a position of the object 300. Human labor cost and time can thus be reduced.

Figure 25:
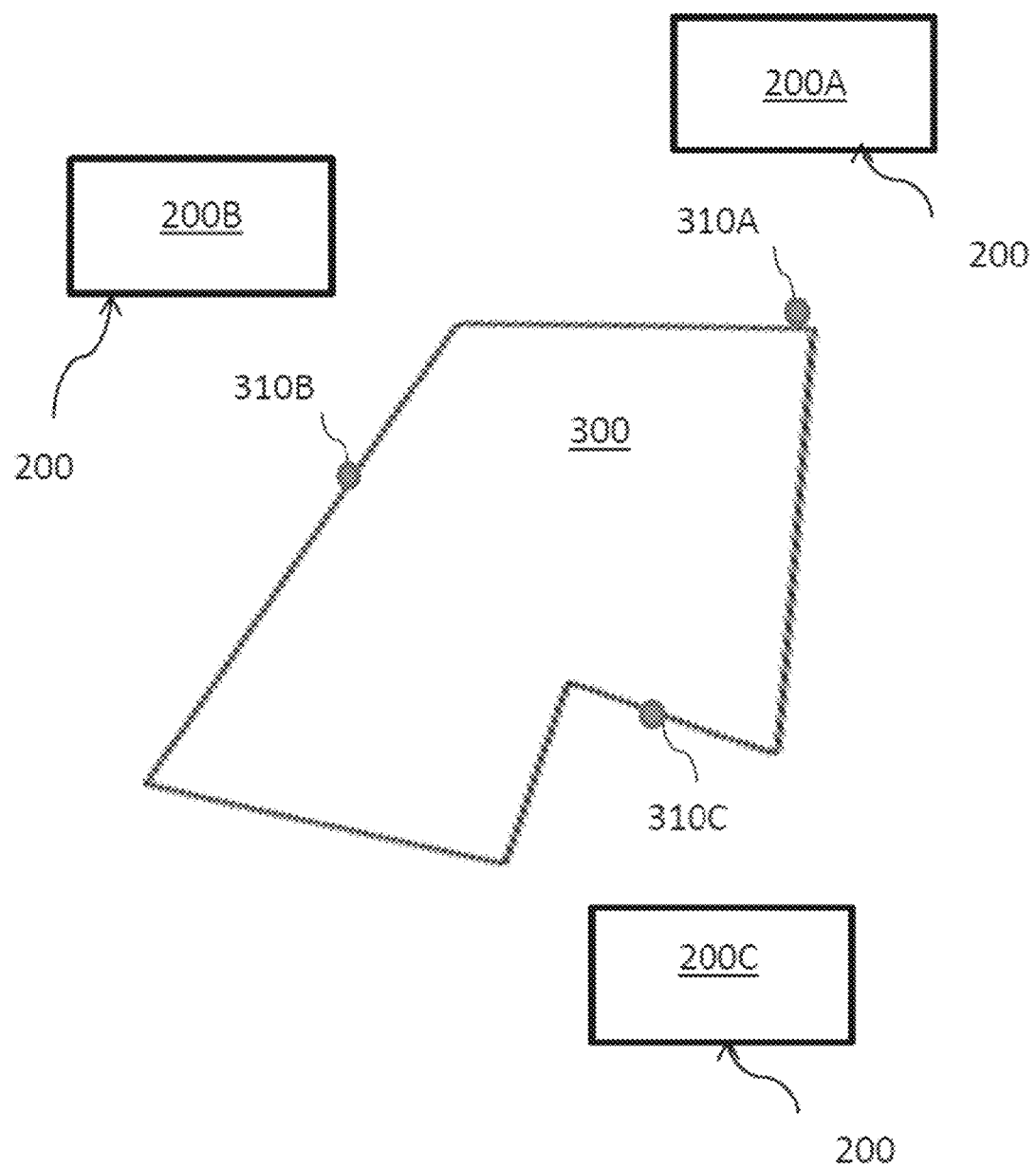
FIG. 25 is an exemplary diagram illustrating another alternative embodiment of the mobile platform of FIG. 1, wherein the mobile platform operates in cooperation with one or more other mobile platforms.

Turning to FIG. 25, a plurality of mobile platforms 200A-200C are shown as servicing the object 300. The mobile platforms 200A-200C can move to service points 310A-310C, respectively. The mobile platforms 200A-200C can perform uniform and/or different tasks, respectively.

The mobile platforms 200A-200C can perform the task(s) in cooperation with each other. That is, each of mobile platforms 200A-200C can perform at least part of a task, in order to collectively perform the task. Additionally and/or alternatively, each of mobile platforms 200A-200C can perform one or more of a plurality of tasks in order to collectively perform the plurality of tasks.

For example, the mobile platform 200A can capture an image of a skyward surface of the object 300 when the object 300 is on the ground. The mobile platform 200C can travel between the object 300 and the ground, to capture an image of a groundward surface of the object 300. Thus, by working in cooperation with each other, the mobile platforms 200A and 200C can respectively capture the images that present different portions of the object 300 and complement each other.

The plurality of mobile platforms 200A-200C can perform the task for the object 300 simultaneously and/or sequentially. The plurality of mobile platforms 200A-200C can be uniform and/or different. Exemplary mobile platforms can include a UAV and/or a ground vehicle. Although FIG. 25 shows three mobile platforms, any number of uniform and/or different mobile platforms 200 can perform the task(s) in cooperation. Multiple mobile platforms 200 can service one service point. Additionally and/or alternatively, one mobile platform 200 can service multiple service points.

Figure 26:
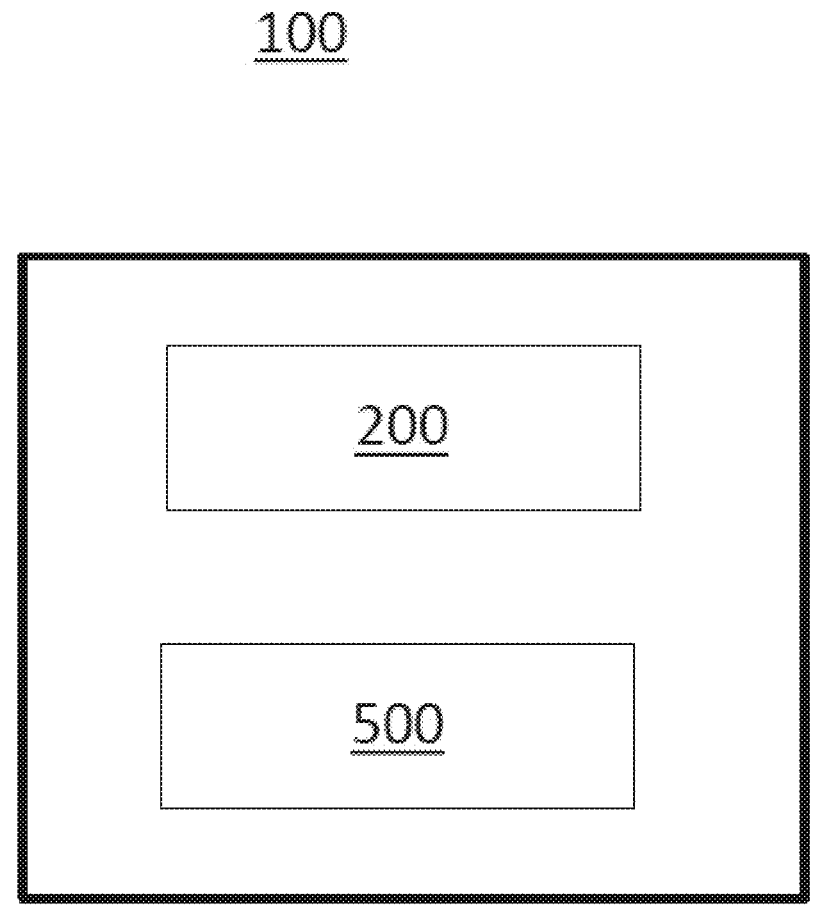

Turning to FIG. 26, the system 100 can further include a terminal device 500 for communicating with the mobile platform 200. The terminal device 500 can include any computer system. An exemplary terminal device 500 can include a mobile phone, a smart phone, a tablet computer, a personal computer, a server computer, and/or the like.

The terminal device 500 can be located distally from the mobile platform 200 during operation of the mobile platform 200 to service the object 300. The terminal device 500 can provide instructions to the mobile platform 200 for implementing functions as described throughout the present disclosure.

Figure 27:
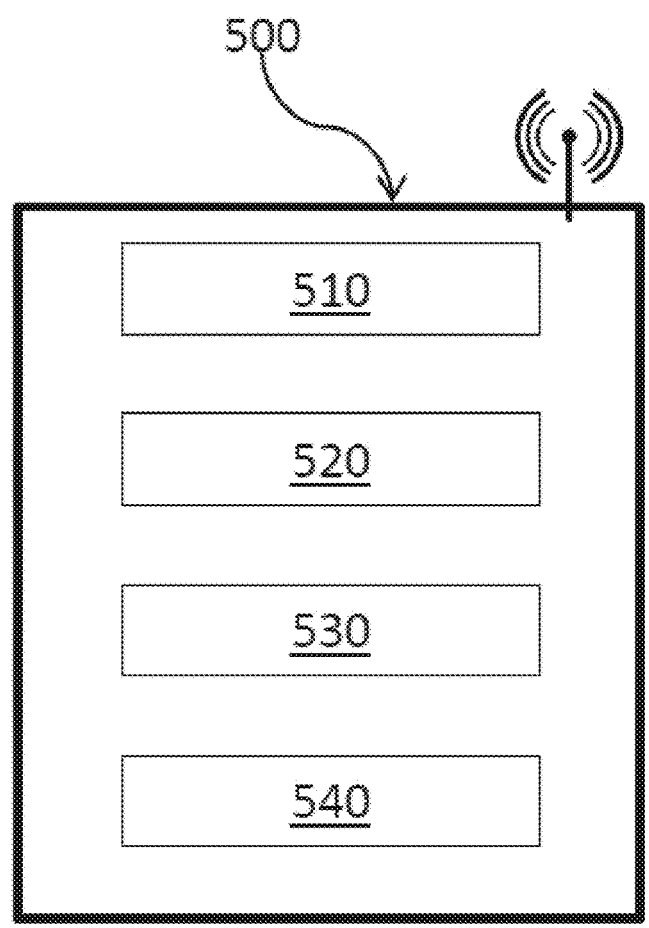
FIG. 27 is an exemplary diagram illustrating an alternative embodiment of the terminal device of FIG. 26.

Turning to FIG. 27, the terminal device 500 can include a processor (and/or central processing unit, or CPU) 510. Although one processor 510 is shown in FIG. 21, the terminal device 500 can include any number of uniform and/or different processors 510.

The terminal device 500 can include a memory 520. The memory 520 can include high-speed random access memory (RAM). Additionally and/or alternatively, the memory 520 can include non-volatile memory, such as one or more magnetic disk storage devices, flash memory devices, and/or other non-volatile solid-state memory devices. Although one memory 520 is shown in FIG. 27, the terminal device 500 can include any number of uniform and/or different memories 520.

The processor 510 can run (or execute) various software programs and/or sets of instructions stored in the memory 520 to perform various functions for the terminal device 500.

The terminal device 500 can include a communication module 530. The communication module 530 can operate to communicate with another computer system, such as the mobile platform control system 210 (shown in FIG. 2), and/or a computer system of a third party. An exemplary communication module 530 can include an RF circuitry that can receive and/or transmit information wirelessly. The terminal device 500 can communicate with the mobile platform 200 directly and/or via a routing device.

Additionally and/or alternatively, the terminal device 500 can include a display system 540. In certain embodiments, the display system 540 can include a touch-sensitive display, which can also be called a "touch screen." The display system 540 can display information stored on the terminal device 500 for presentation.

Figure 28:
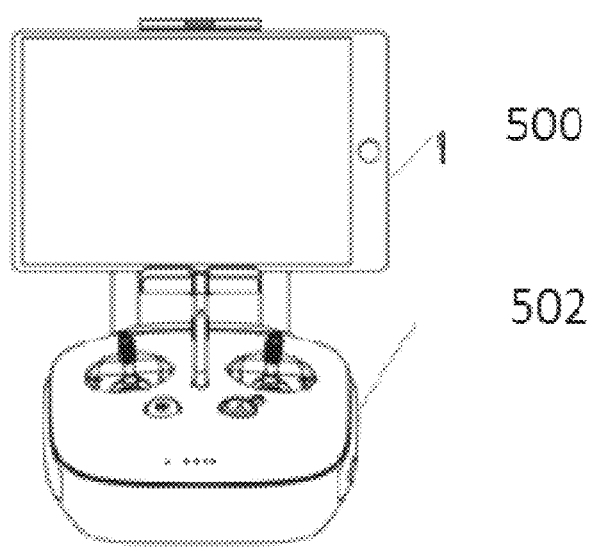
FIG. 28 is an exemplary diagram illustrating another alternative embodiment of the terminal device of FIG. 26, wherein the terminal device is coupled to a remote control.

Turning to FIG. 28, the terminal device 500 can be connected with a remote control 502. For example, the terminal device 500 can be connected with the remote control 502 via an external communication port that supports standards such as Universal Serial Bus (USB), FIREWIRE, and/or the like. The remote control 502 can include one or more processors (not shown) for at least partially controlling operation of the mobile platform 200. The remote control 502 can communicate with the mobile platform 200 via wired and/or wireless methods. For example, various wireless communication methods can be used for remote communication between the mobile platform 200 and the remote control 502. Suitable communication methods include, for example, radio, Wireless Fidelity (Wi-Fi), cellular, satellite, and broadcasting.

The terminal device 500 can communicate with the mobile platform 200 via the remote control 502. That is, the mobile platform 200 can transmit data to the remote control 502. The remote control 502 can transfer the data to the terminal device 500. On the other hand, the terminal device 500 can transfer instructions to the remote control 502. The remote control 502 can transmit the instructions to the mobile platform 200. Stated somewhat differently, the remote control 502 can operate as a data exchange channel to route communication between the terminal device 500 and the mobile platform 200.

Figure 29:
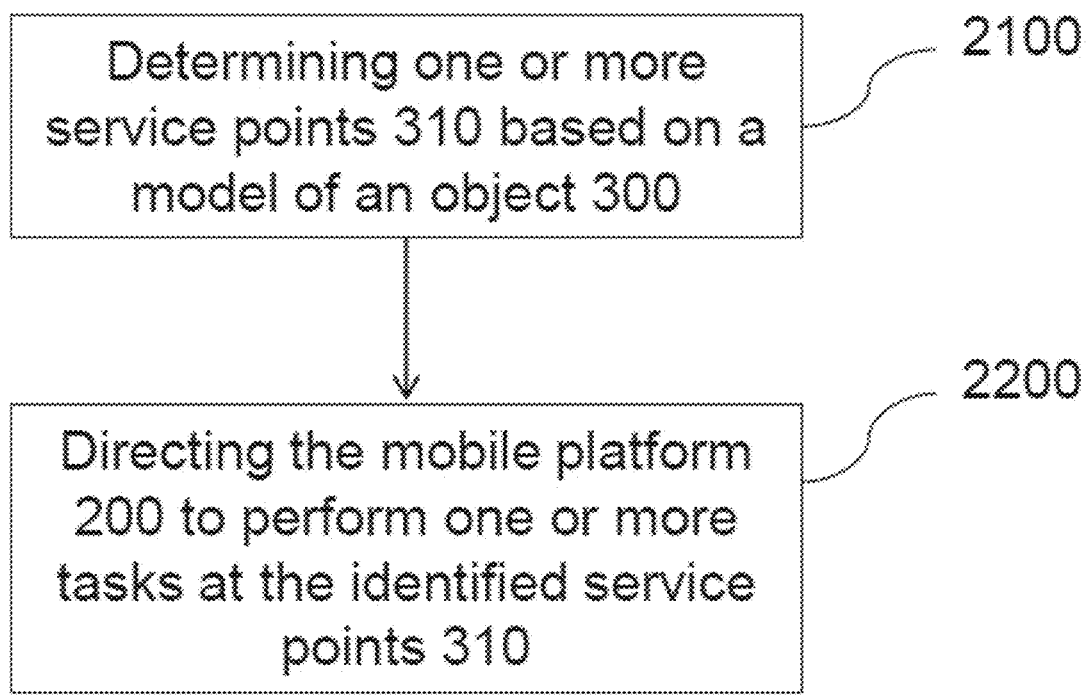
FIG. 29 is an exemplary flow chart illustrating an embodiment of a method for operating a mobile platform using the terminal device of FIG. 26.

FIG. 29 is an exemplary top-level flow chart illustrating an embodiment of a method 2000 for servicing the object 300 via the mobile platform 200. The terminal device 500 (shown in FIG. 27) can implement the method 2000.

One or more service points 310 are determined, at 2100, based on a model of the object 300. The terminal device 500 can determine the service points 310 (shown in FIG. 12) based on the model of the object 300.

For example, the object 300 can include an aircraft, such as a passenger plane. Thus, the model can include three-dimensional information of the plane. Exemplary three-dimensional information can include length, width and/or height of the plane body, slope angle of front surface of the plane, tilt angle of root and/or tip of a wing, a tilt angle between the root and tip of the wing, width of horizontal tail wing and/or horizontal tail wing, or a combination thereof.

The mobile platform 200 is directed, at 2200, to perform one or more tasks at the identified service points 310. The terminal device 500 can direct the mobile platform 200 to perform the tasks. For example, the terminal device 500 can direct the mobile platform 200 to capture an image of the object 300.

Additionally and/or alternatively, the terminal device 500 can direct the mobile platform 200 to maintain the distance D (shown in FIG. 1) from the object 300. The terminal device 500 can determine the range of distances for maintaining the distance D within. For example, the terminal device 500 can determine the lower limit and/or the upper limit for maintaining the distance D.

Figure 30:
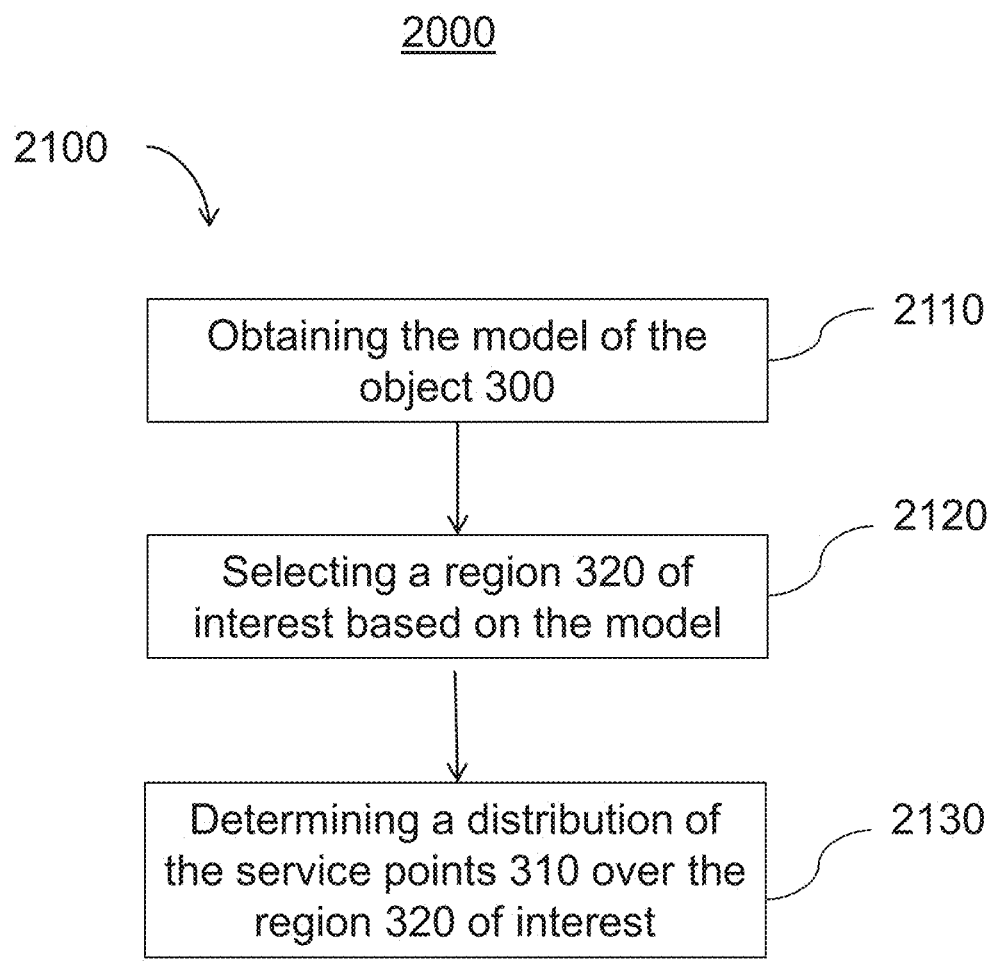
FIG. 30 is an exemplary flow chart illustrating an alternative embodiment of the method of FIG. 29, wherein the terminal device obtains a model of the object.

Turning to FIG. 30, a method 2100 for identifying the one or more service points 310 is shown. The terminal device 500 (shown in FIG. 27) can implement the method 2100.

The model of the object 300 is obtained, at 2110. The terminal device 500 can obtain the model from any sources. For example, a manufacturer and/or builder of the object 300 can provide the model. The object 300 can be measured by certain human/machine to generate the model. When the shape, size and/or dimension of the object 300 changes, the model can change correspondingly.

The terminal device 500 can obtain the model from another computer system and/or a model library. Additionally and/or alternatively, the terminal device 500 can previously store the model in the memory 520 and retrieve the model from the memory 520.

A region 320 of interest is selected, at 2120, based on the model. The terminal device 500 can select the region 320 (shown in FIG. 18) on the object 300. For example, the region 320 can be a surface region of interest on the object 300, such as a surface region having a high probability of damage during usage of the object 300.

The terminal device 500 can select the region 320 autonomously based on predetermined selection criteria, and/or select the region 320 based on selection instruction inputted into the terminal device 500.

A distribution of the service points 310 over the region 320 is determined, at 2130. The distribution of the service points 310 can refer to a density of the service points 310, and/or spatial relationship between the service points 310 and the object 300. The terminal device 500 can determine the distribution of the service points 310 based on any criteria.

For example, when the mobile platform 200 is positioned at the distance D from a service point 310, the payload 290 can perform the task for a sub-region in the region 320. Size and/or shape of the sub-region can be based on the distance D and/or property of the payload 290 (shown in FIG. 21). For example, the camera 290A (shown in FIG. 22) may capture an image of a sub-region of a certain size at the distance D.

In order to perform the task for the region 320 entirely, the terminal device 500 can determine the density based on size and/or shape of the sub-region and the region 320. The terminal device 500 can determine and/or select the service points 310 according to the determined density. Additionally and/or alternatively, the terminal device 500 can determine the travel path for the mobile platform 200 to traverse the service points 310.

Although the method 2100 can include 2110-2130, one or more of 2110-2130 can be omitted.

Additionally and/or alternatively, the terminal device 500 can determine position of a selected service point 310 (shown in FIG. 12). Based on the model, the terminal device 500 can determine spatial relationship between the selected service point 310 and the object 300.

Additionally and/or alternatively, based on the model, the terminal device 500 can determine spatial relationship between selected control points (such as the control points 330a-330c shown in FIG. 15 and FIG. 16) and the object 300.

To determine the absolute coordinates of the control points, a position tracking device can be positioned at the control point to measure the absolute coordinates of the control points 330. The position tracking device can send the measurement result to the terminal device 500.

In certain embodiments, the position tracking device 280 (shown in FIG. 19) onboard the mobile platform 200 can be used for determining the absolute coordinates of the control points 330. In one example, The DGPS module 280A (shown in FIG. 19) onboard the mobile platform 200 can be used for determining the absolute coordinates of the control points 330. Stated somewhat differently, the mobile platform 200 can be positioned at the selected control point by a human and/or a machine. The DGPS module 280A can measure the GPS position of the mobile platform 200, thereby obtaining the position of the control point in the absolute coordinate system. When position and/or orientation of the object 300 changes, such measurement of the absolute coordinates of the control points can be performed, so the position of the service point 310 can be updated.

Additionally and/or alternatively, when the mobile platform 200 includes the camera 290A (shown in FIG. 22), the terminal device 500 can direct the mobile platform 200 to capture images of the object 300 at one or more perspectives. The mobile platform 200 can direct the carrier 292 to adjust orientation of the camera 290A, thereby adjusting perspectives of capturing the images.

Additionally and/or alternatively, the mobile platform 200 can send images to the terminal device 500 for analysis. The terminal device 500 can analyze the images in real time and/or send the images to a third party for analysis and/or storage. Optionally, the display system 540 (shown in FIG. 27) can display the images for inspection.

Various embodiments further disclose computer program product comprising instructions for operating the mobile platform 100. The program/software can be stored in a (non-transitory) computer-readable storage medium including, e.g., Read-Only Memory (ROM), Random Access Memory (RAM), internal memory, register, computer hard disk, removable disk, CD-ROM, optical disk, floppy disk, magnetic disk, or the like. The program/software can include coded instructions to instruct one or more processors on a computer device to execute the methods in accordance with various disclosed embodiments. For example, the program/software can be executed on a computer and/or mobile device in the form of an application program, application, and/or app.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for servicing an object via a mobile platform, comprising:
    obtaining an orientation of the object via one or more control points each having a predetermined relationship with the object;
    obtaining a position of a selected service point of the object based on at least a position and the orientation of the object;
    moving the mobile platform toward the selected service point of the object;
    maintaining a distance between the mobile platform and the object; and
    performing a task for the object while maintaining the distance.

2. The method of claim 1, wherein maintaining the distance includes maintaining a distance between the mobile platform and a surface of the object.

3. The method of claim 1, wherein maintaining the distance includes maintaining the distance based on operation conditions of the mobile platform.

4. The method of claim 1, further comprising:
    monitoring the distance in one or more directions relative to the mobile platform.

5. The method of claim 1, further comprising:
    obtaining the position of the object via the one or more control points.

6. The method of claim 1, wherein performing the task includes performing one or more different tasks.

7. The method of claim 6, wherein performing the one or more different tasks includes performing each of the one or more different tasks using a respective payload on the mobile platform.

8. The method of claim 1, wherein performing the task includes:
    capturing an image of the object by using a camera of the mobile platform; and
    transmitting the image to a computer associated with the mobile platform for analysis of the object.

9. The method of claim 1, wherein performing the task includes performing the task in cooperation with one or more other mobile platforms.

10. The method of claim 9, wherein performing the task includes capturing an image of the object that complements one or more images captured by the one or more other mobile platforms.

11. A system for servicing an object, comprising:
    a trip controller operating onboard a mobile platform and configured to direct the mobile platform to:
        obtain an orientation of the object via one or more control points each having a predetermined relationship with the object;
        obtain a position of a selected service point of the object based on at least a position and the orientation of the object;
        move the mobile platform toward the selected service point of the object;
        maintain a distance between the mobile platform and the object; and
        perform a task for the object at the maintained distance.

12. The system of claim 11, wherein the trip controller is further configured to direct the mobile platform to maintain a distance between the mobile platform and a surface of the object.

13. The system of claim 11, wherein the position of the object is determined based on the one or more control points.

14. The system of claim 11, wherein the trip controller is further configured to direct the mobile platform to perform one or more different tasks.

15. The system of claim 14, wherein the mobile platform is configured to carry a respective payload for performing each of the different tasks.

* * * * *